US012083805B2

(12) United States Patent
Murayama et al.

(10) Patent No.: US 12,083,805 B2
(45) Date of Patent: Sep. 10, 2024

(54) RECORDING APPARATUS

(71) Applicant: CANON KABUSHIKI KAISHA, Tokyo (JP)

(72) Inventors: Yoshiaki Murayama, Tokyo (JP); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/529,958

(22) Filed: Nov. 18, 2021

(65) Prior Publication Data

US 2022/0169036 A1 Jun. 2, 2022

(30) Foreign Application Priority Data

Nov. 27, 2020 (JP) ................................ 2020-197649

(51) Int. Cl.
*B41J 2/21* (2006.01)

(52) U.S. Cl.
CPC .................................. *B41J 2/2135* (2013.01)

(58) Field of Classification Search
CPC ...... B41J 2/2114; B41J 2/2146; B41J 2/2135; B41J 2/0458; B41J 2/04588; B41J 2/2107; B41J 29/38
See application file for complete search history.

(56) References Cited

U.S. PATENT DOCUMENTS

2007/0285463 A1* 12/2007 Kanda .................... B41J 2/2125 347/40
2012/0276293 A1* 11/2012 Hirakawa ............ B41J 11/0015 118/313

FOREIGN PATENT DOCUMENTS

| | | | |
|---|---|---|---|
| JP | 2007216495 | A | 8/2007 |
| JP | 2007276400 | A | 10/2007 |
| JP | 2008055852 | A | 3/2008 |
| JP | 205123747 | A | 7/2015 |

* cited by examiner

*Primary Examiner* — Jannelle M Lebron
(74) *Attorney, Agent, or Firm* — Canon U.S.A., Inc. IP Division

(57) ABSTRACT

A bold process is performed on the number of consecutive pixels to which colored ink is applied and a number of pixels (the number is an odd number of 1 or more). In this way, the application locations of the functional ink can be set with a resolution higher than that of the colored ink.

14 Claims, 23 Drawing Sheets

| FIG.8A (600 dpi) | FIG.8B (1200 dpi) | FIG.8C | FIG.8D | FIG.8E | FIG.8F | FIG.8G |
|---|---|---|---|---|---|---|
| 0 | 0 0 / 0 0 | 0 0 / 0 0 | 0 0 / 0 0 | 0 0 / 0 0 | 0 0 / 0 0 | 0 0 / 0 0 |
| 1 | 1 0 / 0 0 | 1 0 / 0 0 | 1 0 / 0 0 | 0 0 / 0 0 | 0 0 / 0 0 | 0 0 / 0 0 |
| 2 | 1 0 / 0 1 | 1 0 / 0 1 | 1 0 / 0 0 | 0 0 / 0 0 | 0 0 / 0 1 | 0 0 / 0 0 |
| 3 | 1 0 / 1 1 | 1 0 / 1 1 | 1 0 / 0 0 | 0 0 / 1 0 | 0 0 / 0 1 | 0 0 / 0 0 |
| 4 | 1 1 / 1 1 | 1 1 / 1 1 | 1 0 / 0 0 | 0 0 / 1 0 | 0 0 / 0 1 | 0 1 / 0 0 |
| 5 | 2 1 / 1 1 | 1 1 / 1 1 | 1 0 / 0 0 | 0 0 / 1 0 | 1 0 / 0 1 | 0 1 / 0 0 |
| 6 | 2 1 / 1 2 | 1 1 / 1 1 | 1 0 / 0 1 | 0 0 / 1 0 | 1 0 / 0 1 | 0 1 / 0 0 |
| 7 | 2 1 / 2 2 | 1 1 / 1 1 | 1 0 / 0 1 | 0 0 / 1 0 | 1 0 / 0 1 | 0 1 / 1 0 |
| 8 | 2 2 / 2 2 | 1 1 / 1 1 | 1 0 / 0 1 | 0 1 / 1 0 | 1 0 / 0 1 | 0 1 / 1 0 |
| 9 | 3 2 / 2 2 | 1 1 / 1 1 | 1 0 / 0 1 | 1 1 / 1 0 | 1 0 / 0 1 | 0 1 / 1 0 |
| 10 | 3 2 / 2 3 | 1 1 / 1 1 | 1 0 / 0 1 | 1 1 / 1 0 | 1 0 / 0 1 | 0 1 / 1 1 |
| 11 | 3 2 / 3 3 | 1 1 / 1 1 | 1 0 / 0 1 | 1 1 / 1 0 | 1 0 / 1 1 | 0 1 / 1 1 |
| 12 | 3 3 / 3 3 | 1 1 / 1 1 | 1 1 / 0 1 | 1 1 / 1 0 | 1 0 / 1 1 | 0 1 / 1 1 |
| 13 | 4 3 / 3 3 | 1 1 / 1 1 | 1 1 / 0 1 | 1 1 / 1 0 | 1 0 / 1 1 | 1 1 / 1 1 |
| 14 | 4 3 / 3 4 | 1 1 / 1 1 | 1 1 / 0 1 | 1 1 / 1 1 | 1 0 / 1 1 | 1 1 / 1 1 |
| 15 | 4 3 / 4 4 | 1 1 / 1 1 | 1 1 / 1 1 | 1 1 / 1 1 | 1 0 / 1 1 | 1 1 / 1 1 |

X
Y

FIG.17A
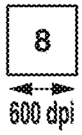
FIG.17B
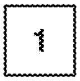
FIG.17C
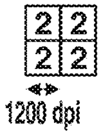
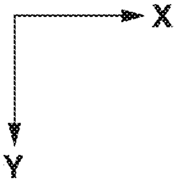
FIG.17D
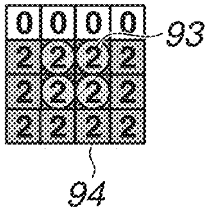
FIG.17E
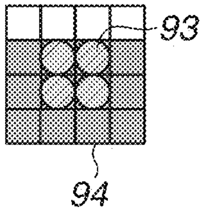
FIG.17D'
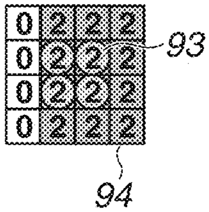
FIG.17E'
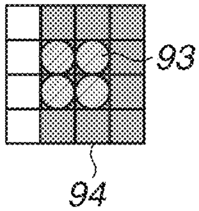
FIG.17D''
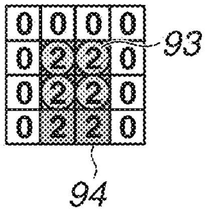
FIG.17E''
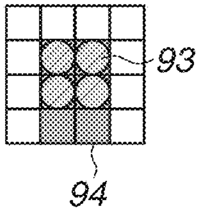
FIG.17D'''
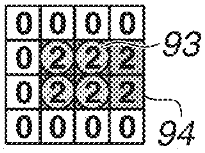
FIG.17E'''
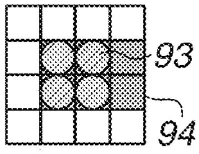
FIG.17D''''
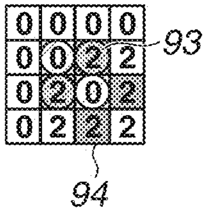
FIG.17E''''
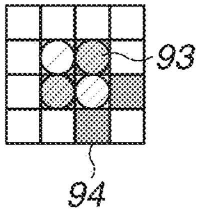

FIG.17F
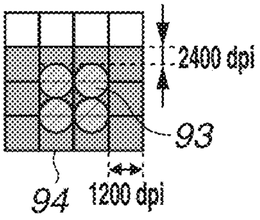
FIG.17G
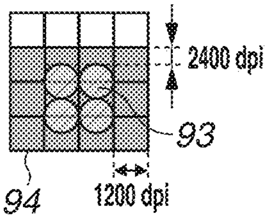
FIG.17F'
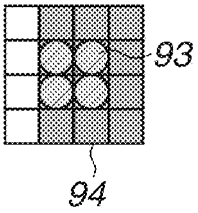
FIG.17G'
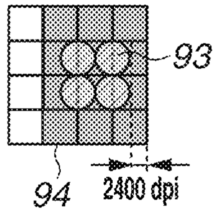
FIG.17F''
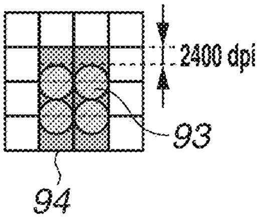
FIG.17G''
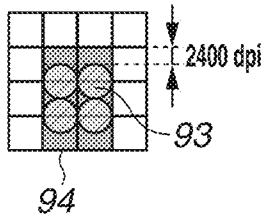
FIG.17F'''
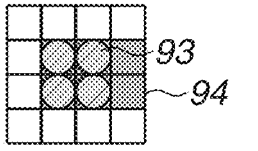
FIG.17G'''
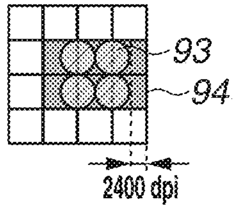
FIG.17F''''
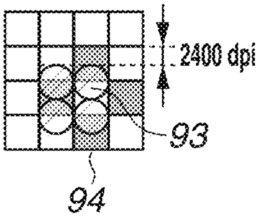
FIG.17G''''
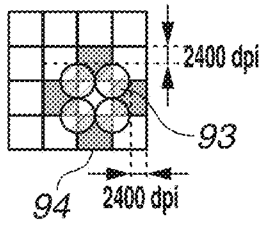
FIG.17H
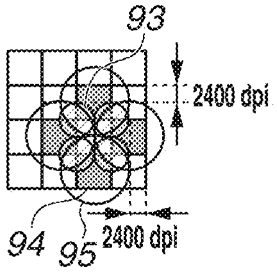

FIG.18A
FIG.18B
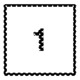
FIG.18C
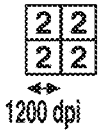
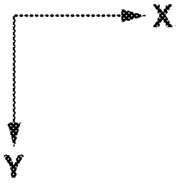
FIG.18D
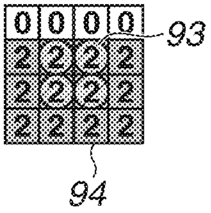
FIG.18E
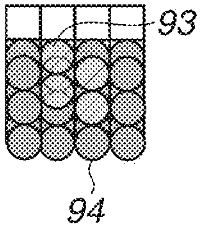
FIG.18D'
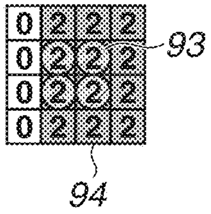
FIG.18E'
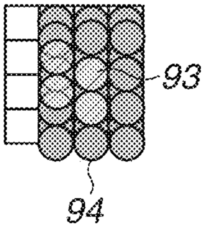
FIG.18D''
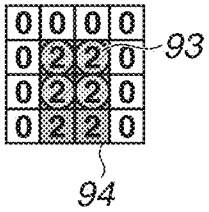
FIG.18E''
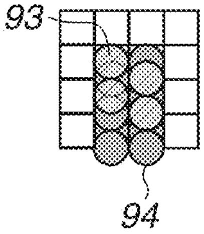
FIG.18D'''
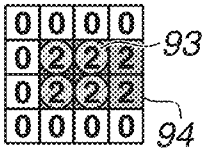
FIG.18E'''
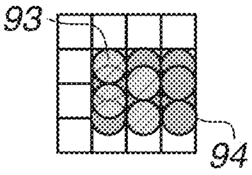
FIG.18D''''
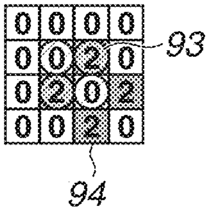
FIG.18E''''
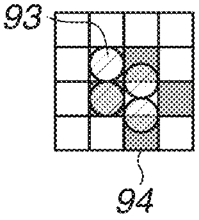

FIG.18F
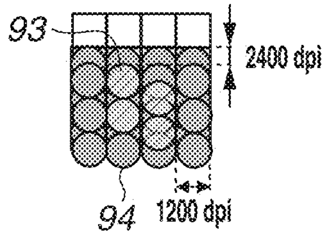
FIG.18G
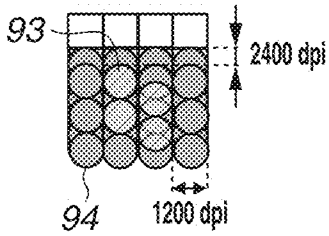
FIG.18F'
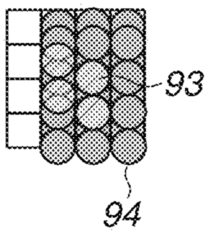
FIG.18G'
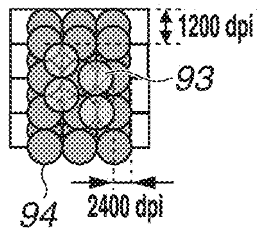
FIG.18F''
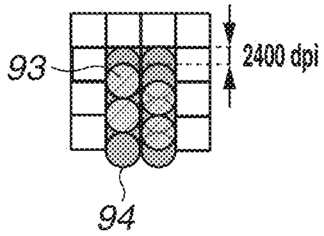
FIG.18G''
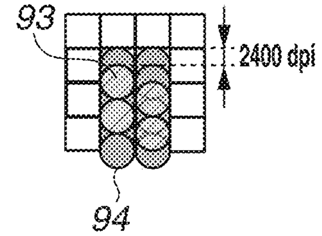
FIG.18F'''
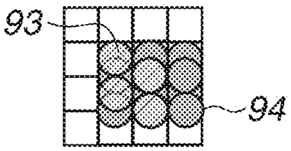
FIG.18G'''
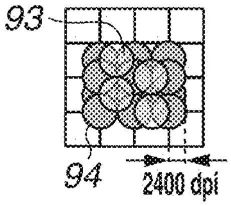
FIG.18F''''
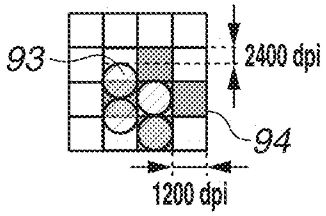
FIG.18G''''
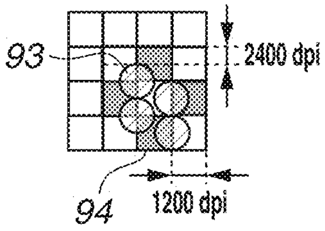
FIG.18H
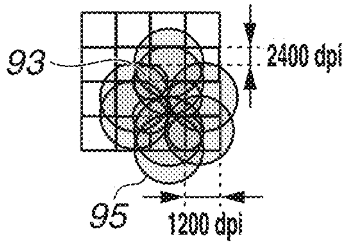

RECORDING APPARATUS

BACKGROUND

Field of the Disclosure

The present disclosure relates to a recording apparatus for recording an image on a recording medium.

Description of the Related Art

There is conventionally known a recording apparatus for recording an image on a recording medium by discharging ink onto the recording medium while causing a recording head having a discharge port column in which a plurality of discharge ports are arranged to perform a scanning operation relative to the recording medium. In such a recording apparatus, there is known a technique of improving the image quality by causing liquid that gives functionality to colored ink to land on a recording medium before or after the colored ink is landed.

Examples of the functional ink include reaction liquid that causes colored ink to react or condense, optimizer that gives glossiness to print film, white ink that improves generation of color on transparent film, and metallic ink that gives metallic luster. While such functional liquid is basically applied to cover colored ink, deviated landing could occur between the colored ink and the functional ink due to various reasons.

Japanese Patent Application Laid-Open No. 2007-276400 discusses generating reaction liquid application data by performing an expansion process on colored ink data.

Since the expansion process discussed in Japanese Patent Application Laid-Open No. 2007-276400 is applied to quantized colored ink data, the unit of the execution of the expansion process is the same as the resolution of the quantization of the colored ink data. For example, when the resolution of the colored ink data is 600 dots per inch (dpi), the expansion process is performed with the same resolution of 600 dpi, and reaction liquid application data for discharging reaction liquid to surrounding pixels neighboring the pixels to which the colored ink is applied is generated.

SUMMARY

Embodiments of the present disclosure are directed to improving image quality by using an appropriate functional ink application amount.

According to embodiments of the present disclosure, a recording apparatus includes a recording unit including a first discharge port group in which a plurality of first discharge ports for discharging first ink containing color material to a recording medium are disposed in a first direction and a second discharge port group in which a plurality of second discharge ports for discharging second ink having functionality with respect to the first ink to a recording medium are disposed in the first direction, at least one of the second discharge ports being disposed between two first discharge ports, neighboring each other in the first direction, of the plurality of first discharge ports, a generation unit configured to generate second application data for applying the second ink from the second discharge port group based on first application data for applying the first ink from the first discharge port group, and a control unit configured to control the recording unit to apply the second ink based on the second application data, wherein the generation unit generates the second application data such that pixels indicating, in the second application data, that the second ink is applied become consecutive in (L+M) pixels (M is an odd number of 1 or more) in the first direction so as to correspond to pixels indicating that the first ink is applied in the first application data and are L consecutive pixels (L is an integer of 1 or more) in the first direction.

Further features of the present disclosure will become apparent from the following description of exemplary embodiments with reference to the attached drawings.

BRIEF DESCRIPTION OF THE DRAWINGS

FIGS. 8A to 8G illustrate examples of index patterns.

FIGS. 17A to 17H illustrate bold processes according to the second exemplary embodiment.

FIGS. 18A to 18H illustrate bold processes according to the second exemplary embodiment.

DESCRIPTION OF THE EMBODIMENTS

Hereinafter, exemplary embodiments of the present disclosure will be described with reference to the attached drawings. The following exemplary embodiments will be described by using, as functional ink, reaction liquid containing a component that reacts to or condenses with the color material contained in colored ink. As will be described below, the functional ink is not limited to the above-described reaction liquid. Any functional ink having functionality with respect to colored ink is applicable.

Figure 1:
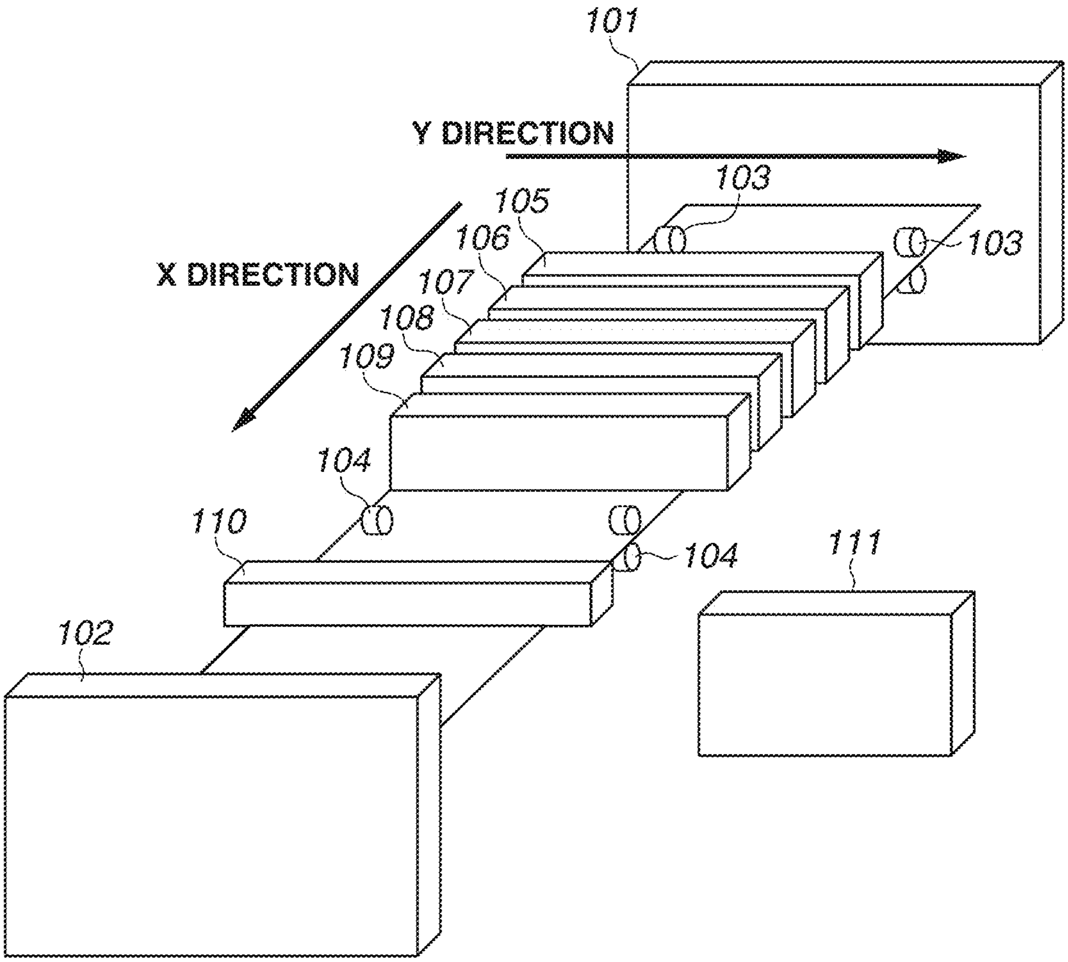
FIG. 1 illustrates an internal configuration of a recording apparatus according to a first exemplary embodiment.

FIG. 1 illustrates an internal configuration of an inkjet recording apparatus (hereinafter, also referred to as a recording apparatus) according to a first exemplary embodiment. The recording apparatus according to the present exemplary embodiment uses recording heads, each of which has discharge ports for discharging ink, to record an image on a recording medium conveyed in a direction crossing the direction in which the discharge ports are disposed. In other words, the recording apparatus is a full multi type inkjet recording apparatus.

A recording medium P supplied from a supply unit 101 is conveyed in a +X direction (i.e., a conveyance direction and a sub-scanning direction (X)) at a predetermined speed while being sandwiched between conveyance roller pairs 103 and 104 and is discharged by a discharge unit 102. In addition, recording heads 105 to 109 are arranged side by side in the conveyance direction between the upstream conveyance roller pair 103 and the downstream conveyance roller pair 104 and discharge ink in a Z direction in accordance with recording data. These recording heads 105 to 109 discharge reaction liquid, yellow (Y) ink, magenta (M) ink, cyan (C) ink, and black (K) ink, respectively. In addition, these kinds of ink are supplied to the recording heads 105 to 109 via tubes not illustrated.

According to the present exemplary embodiment, the recording medium P may be a continuous sheet held in a roll by the supply unit 101 or a cut sheet previously cut into a standard size. In a case where a continuous sheet is used as the recording medium P, after the recording heads 105 to 109 end a recording operation, a cutter 110 cuts the continuous sheet into a predetermined length, and the discharge unit 102 classifies the cut sheets according to size, and discharges the classified sheets onto a discharge tray. A print control unit 111 collectively controls the individual units of the printer.

Figures 2A, 2B:
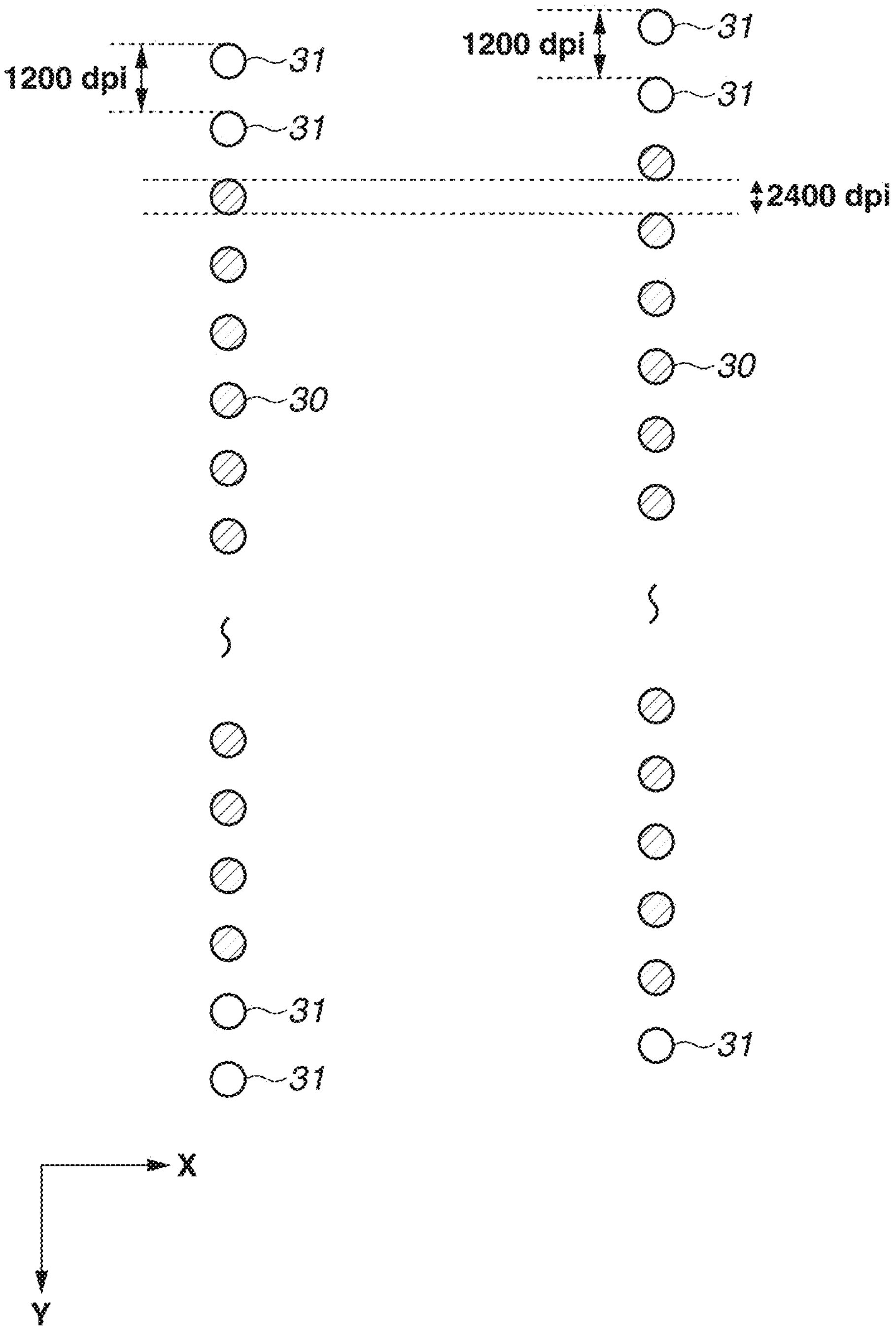
FIGS. 2A and 2B illustrate recording heads according to the first exemplary embodiment.

FIG. 2 illustrates the recording heads according to the present exemplary embodiment. In FIG. 2, of all the recording heads 105 to 109, only the recording head 109 (FIG. 2A) discharging black ink and the recording head 105 (FIG. 2B) discharging reaction liquid are illustrated. The other recording heads 106 to 108 have the same configuration as that of the recording head 109. In addition, electro-thermal conversion elements serving as recording elements are arranged at locations facing the individual discharge ports 30 arranged on the individual recording head (inside the individual recording head). By driving these electro-thermal conversion elements, thermal energy is generated, and an ink discharge operation is performed. While the electro-thermal conversion elements are used as the recording elements in this example, piezoelectric elements, electrostatic elements, or micro electro mechanical system (MEMS) elements may alternatively be used.

On the recording head 109, a plurality of discharge ports 30 capable of discharging colored ink containing color material are disposed at certain intervals in a Y direction (i.e., a direction in which the discharge ports 30 are disposed and a main-scanning direction (Y)) crossing an X direction. In FIGS. 2A and 2B, for simplicity, the individual discharge port column is formed by 14 discharge ports 30. However, in reality, the discharge ports 30 are disposed in a range such that the entire width of a recording medium in the Y direction can be recorded.

Regarding the individual discharge port column. 1200 discharge ports 30 are disposed per inch. This recording resolution will be referred to as 1200 dots per inch (dpi). Those discharge ports 30 indicated as shaded areas are used for recording, and discharge ports 31 indicated as white areas are used for Y registration and an expansion process, which will be described below. As illustrated in FIGS. 2A and 2B, the discharge ports of the recording head 105 are shifted from the discharge ports of the recording head 109 by 2400 dpi in the Y direction.

Figure 3:
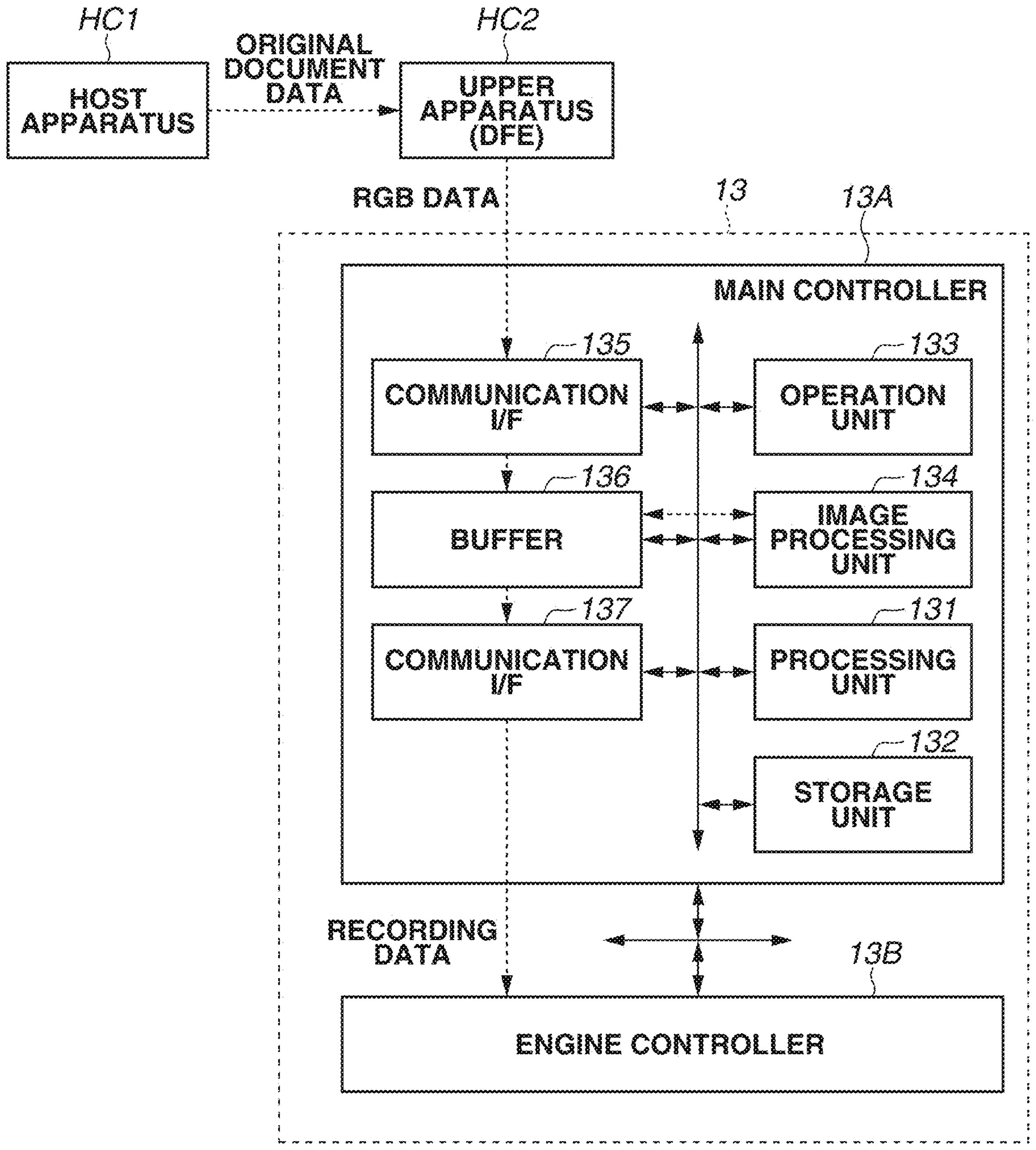
FIG. 3 is a block diagram illustrating a recording control system according to the first exemplary embodiment.

FIG. 3 is a block diagram illustrating a recording control system according to the present exemplary embodiment. A recording control system 13 inside the recording apparatus is connected to and communicates with an upper apparatus (DFE) HC2, which is connected to and communicates with a host apparatus HC1.

The host apparatus HC1 generates or stores original document data used as a base of a recording image. For example, this original document data is generated in an electronic file format, such as a document file or an image file. This original document data is transmitted to the upper apparatus HC2, and the upper apparatus HC2 converts the received original document data into a data format that can be used in the recording control system 13, for example, into red, green, and blue (RGB) data representing an image by RGB. The data obtained as a result of the conversion is transmitted from the upper apparatus HC2 to the recording control system 13 in the recording apparatus.

The recording control system 13 is roughly divided to a main controller 13A and an engine controller 13B. The main controller 13A includes a processing unit 131, a storage unit 132, an operation unit 133, an image processing unit 134, a communication interface (I/F) 135, a buffer 136, and a communication I/F 137.

The processing unit 131 is a processor such as a central processing unit (CPU) and comprehensively controls the main controller 13A by executing a program stored in the storage unit 132. The storage unit 132 is a storage device such as a random access memory (RAM), a read-only memory (ROM), a hard disk, and a solid state drive (SSD), stores a program and data to be executed by the processing unit 131, and provides a work area for the processing unit 131. The operation unit 133 is an input device such as a touch panel, a keyboard, and a mouse, to receive user instructions.

The image processing unit 134 is an electronic circuit having an image processing processor, for example. The buffer 136 is, for example, a RAM, a hard disk, or an SSD. The communication I/F 135 communicates with the upper apparatus HC2, and the communication I/F 137 communicates with the engine controller 13B.

The dashed arrows in FIG. 3 illustrate the flow of the processing of data input to the recording control system 13. The data received from the upper apparatus HC2 via the communication IF 135 is stored in the buffer 136. The image processing unit 134 reads the data from the buffer 136, generates recording data used by a print engine by performing predetermined image processing on the read data, and stores the generated recording data in the buffer 136.

Next, after the image processing, the recording data stored in the buffer 136 is transmitted to the engine controller 13B from the communication I/F 137. Next, the engine controller 13B drives the recording elements of the recording heads 105 to 109 based on the recording data and performs a recording operation.

While the main controller 13A in FIG. 3 includes one processing unit 131, one storage unit 132, and one image processing unit 134, the main controller 13A may include a plurality of processing units 131, a plurality of storage units 132, and a plurality of image processing units 134.

<Image Processing>

Figure 4:
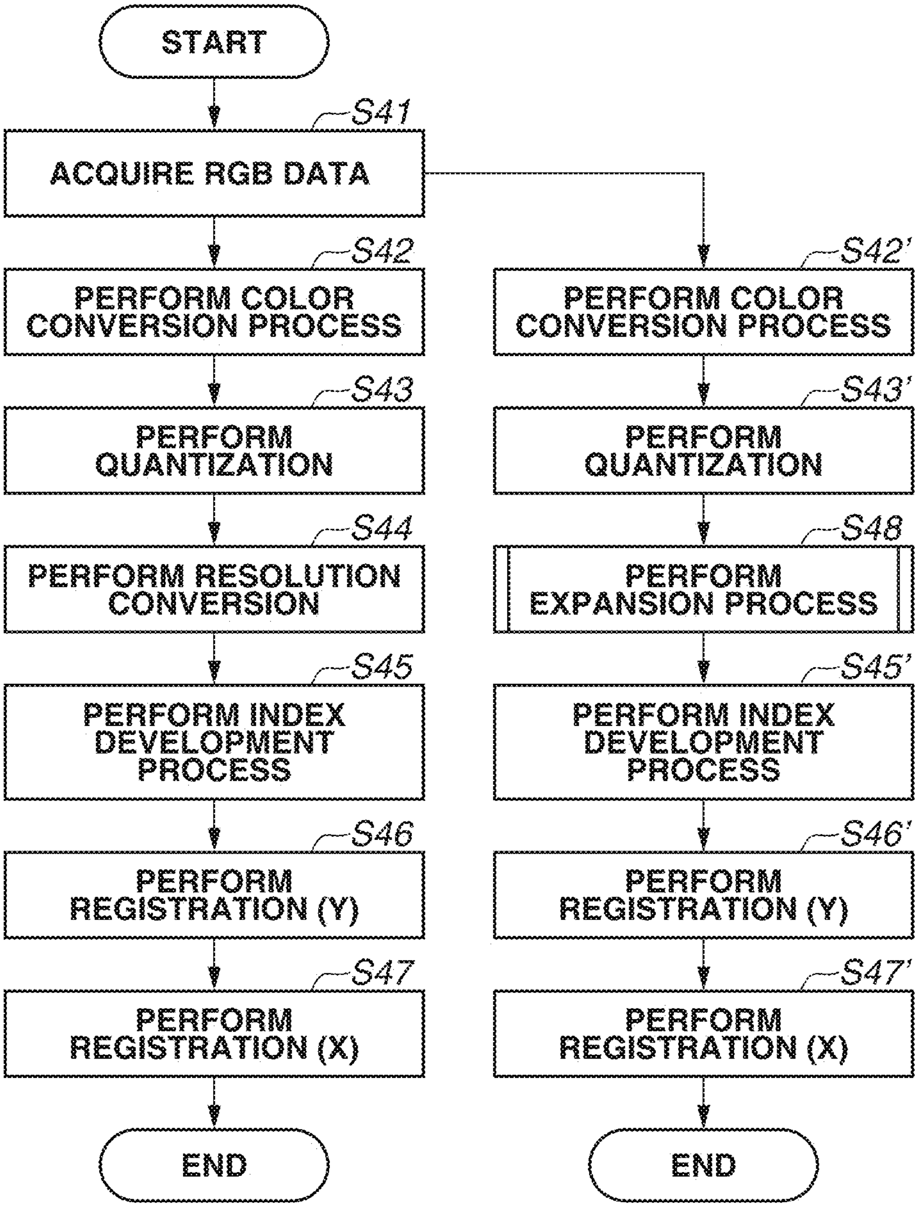
FIG. 4 is a flowchart illustrating image processing procedure according to the first exemplary embodiment.

FIG. 4 is a flowchart of a control program for performing data generation processing according to the present exemplary embodiment. When an instruction for starting the image processing is input, in step S41, the image processing unit 134 acquires RGB data read from the buffer 136. According to the present exemplary embodiment, the RGB data is formed by R, G, and B data, each of which is formed by 8 bits, and has a data resolution of 600 dpi in the Y direction and 600 dpi in the X direction. In step S41, the image processing unit 134 generates reaction liquid data (8-bit RGB data) from the RGB data.

Next, in step S42, the image processing unit 134 performs color conversion processing for converting the RGB data into CMYK data corresponding to ink colors used for recording. Through this color conversion processing, 4-plane CMYK data, each of which is formed by 12 bits, is generated. In step S42', color conversion processing is also performed to generate one-plane reaction liquid data formed by 12 bits.

Next, in step S43, quantization is performed on the CMYK data to generate CMYK quantization data, each of which is formed by 4 bits. As this quantization processing, a dither method, an error diffusion method, or the like may be performed. In step S43', 4-bit quantization data is also generated for the reaction liquid data. According to the present exemplary embodiment, quantization data having a data resolution of 600 dpi is generated by the quantization processing. Next, in step 44, resolution conversion is performed on the CMYK quantization data.

Figures 5A, 5B:
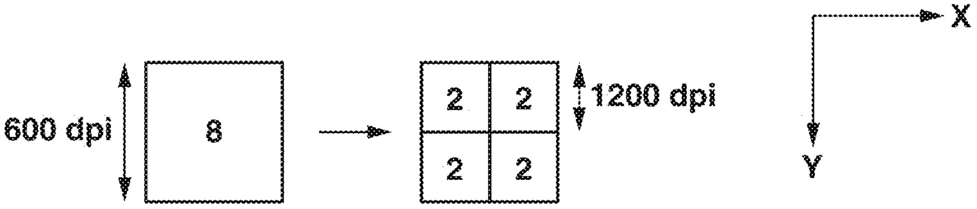
FIGS. 5A and 5B illustrate resolution conversion according to the first exemplary embodiment.

FIGS. 5A and 5B illustrate a concept of the resolution conversion. By performing the resolution conversion on quantization data, which is one pixel with a resolution of 600 dpi as illustrated in FIG. 5A, four pixels of quantization data, each of which has a resolution of 1200 dpi as illustrated in FIG. 5B, is generated. The representative quantization value after the resolution conversion is determined based on the value before the conversion is performed. The numerical values in the pixels in FIGS. 5A and 5B are representative quantization values. The data after the resolution conversion is 3-bit data.

Figure 6:
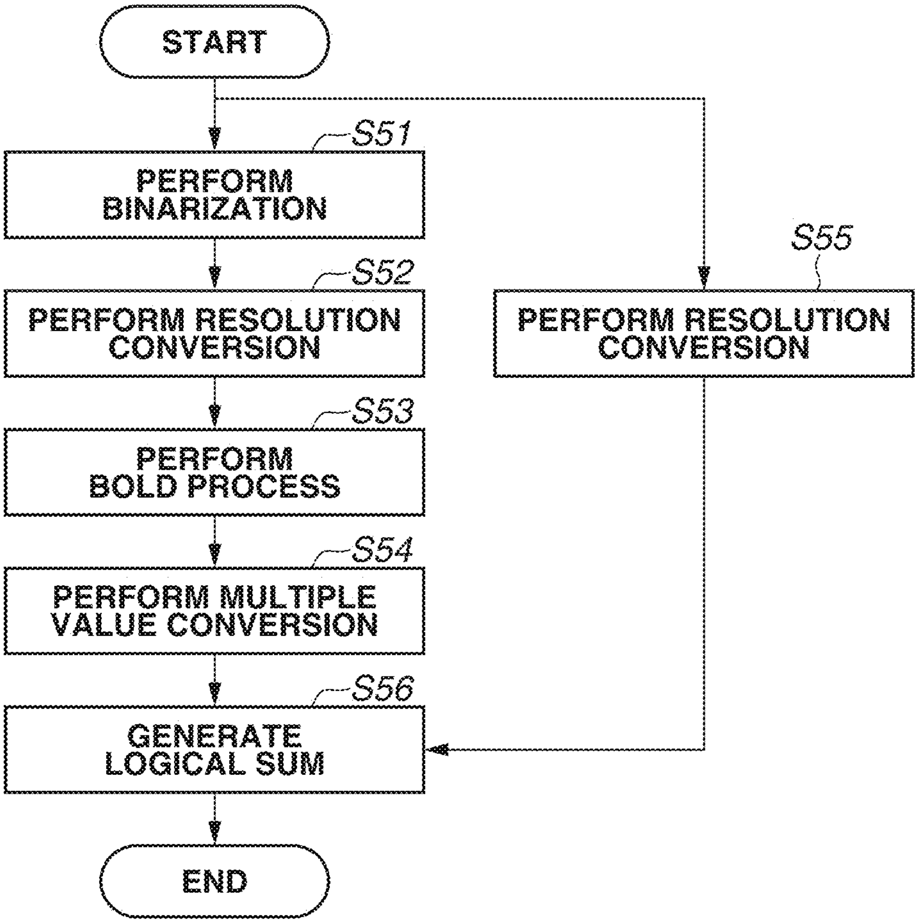
FIG. 6 is a flowchart illustrating an expansion process according to the first exemplary embodiment.

On the other hand, in step S48, an expansion process is performed on the reaction liquid data. FIG. 6 is a flowchart illustrating details of the expansion process in step S48. In step S51, the reaction liquid data is binarized. In the present exemplary embodiment, a pixel with data indicating recording is converted into "1", and a pixel without data indicating recording is converted into "0".

Figures 7A, 7B:
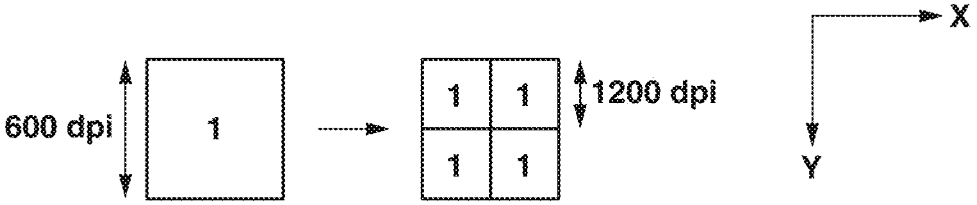
FIGS. 7A and 7B illustrate an example of resolution conversion according to the first exemplary embodiment.

In step S52, resolution conversion is performed. FIG. 7 illustrates the resolution conversion in step S52 in which data of 600 dpi×600 dpi is converted into data of 1200 dpi×1200 dpi. In step S53, a bold process is performed, and data (bold data) indicating recording of a pixel around a target pixel in at least one of the main-scanning direction (Y) and the sub-scanning direction (X) is generated. On the other hand, in step S55, resolution conversion is performed on the data on which the bold process has not been performed.

Next, in step S54, the binary bold data is converted into 3-bit quantization data. As the individual representative quantization value obtained as a result of the conversion, an arbitrary value can be specified for the individual pixel on which the bold process is performed. Next, in step S56, the bold data is generated by making a logical sum of the data on which the bold process has been performed and the data on which the bold process has not been performed. By obtaining a logical sum, a representative quantization value of the portion on which the bold process has been performed and the portion on which the bold process has not been performed can be set individually. The expansion process according to the present exemplary embodiment will be described in detail below.

Next, in step S45, an index development process is performed to convert the 3-bit CMYK quantization data into 1-bit CMYK data. As to the reaction liquid data, in step S45', an index development process is performed to convert the quantization data on which the expansion process has been performed into 1-bit data. In a case where a recording head representing a color includes a plurality of discharge port columns, 1-bit data is generated for each column through this index development process.

FIGS. 8A to 8G schematically illustrate index patterns according to the present exemplary embodiment. More specifically, FIG. 8A illustrates gradation values indicated by 4-bit information corresponding to the quantization data with a resolution of 600 dpi on which the resolution conversion has not been performed. FIG. 8B illustrates gradation values indicated by 3-bit information corresponding to the quantization data with a resolution of 1200 dpi on which the resolution conversion has been performed. FIG. 8C illustrates binary data obtained from the 3-bit quantization data. As seen from FIG. 8C, when data with the gradation value of level 0 is input in an area with the resolution of 600 dpi×600 dpi, a value "0" indicating non-discharge of ink is set in each pixel with the resolution of 1200 dpi×1200 dpi. Next, when synthesized data having a level-1 gradation value is input, a value "1" indicating discharge of ink is set only to the top left pixel in FIG. 8B. Next, when synthesized data with the gradation value of level 2 is input, a value "1" is also set to the bottom right pixel in addition to the top left pixel.

In this way, as the gradation value of the synthesized data increases by one, the number of pixels in which a value "1" is set increases by one. According to the present exemplary embodiment, since a single column of discharge ports is used per color as illustrated in FIG. 2, the maximum gradation value recordable for each color is 4 as illustrated in FIG. 8C. In a case where four columns of discharge ports are used for each color with a resolution of 1200 dpi, the maximum recordable gradation value will be 15 as illustrated in FIGS. 8D to 8G.

The index development process is performed in steps S45 and S45' as described above, and as a result, the image data constituted by 1-bit information indicating discharge/non-discharge of ink with a resolution of 1200 dpi×1200 dpi is generated.

Next, in steps S46 and S46', registration adjustment in the main-scanning direction (Y) is performed on the individual CMYK color data and the reaction liquid data. According to the present exemplary embodiment, the Y registration is not performed. Next, the recording data is transmitted to the engine controller 13B.

Next, in steps S47 and S47', the engine controller 13B performs registration adjustment in the sub-scanning direction (X) on the individual CMYK color data and the reaction liquid data.

As a result, the deviated landing between the CMYK data and the reaction liquid data in the sub-scanning direction (X) is corrected. Next, a recording operation based on the recording data is performed.

Figures 9A, 9B, 9C, 9D, 9E, 9F:
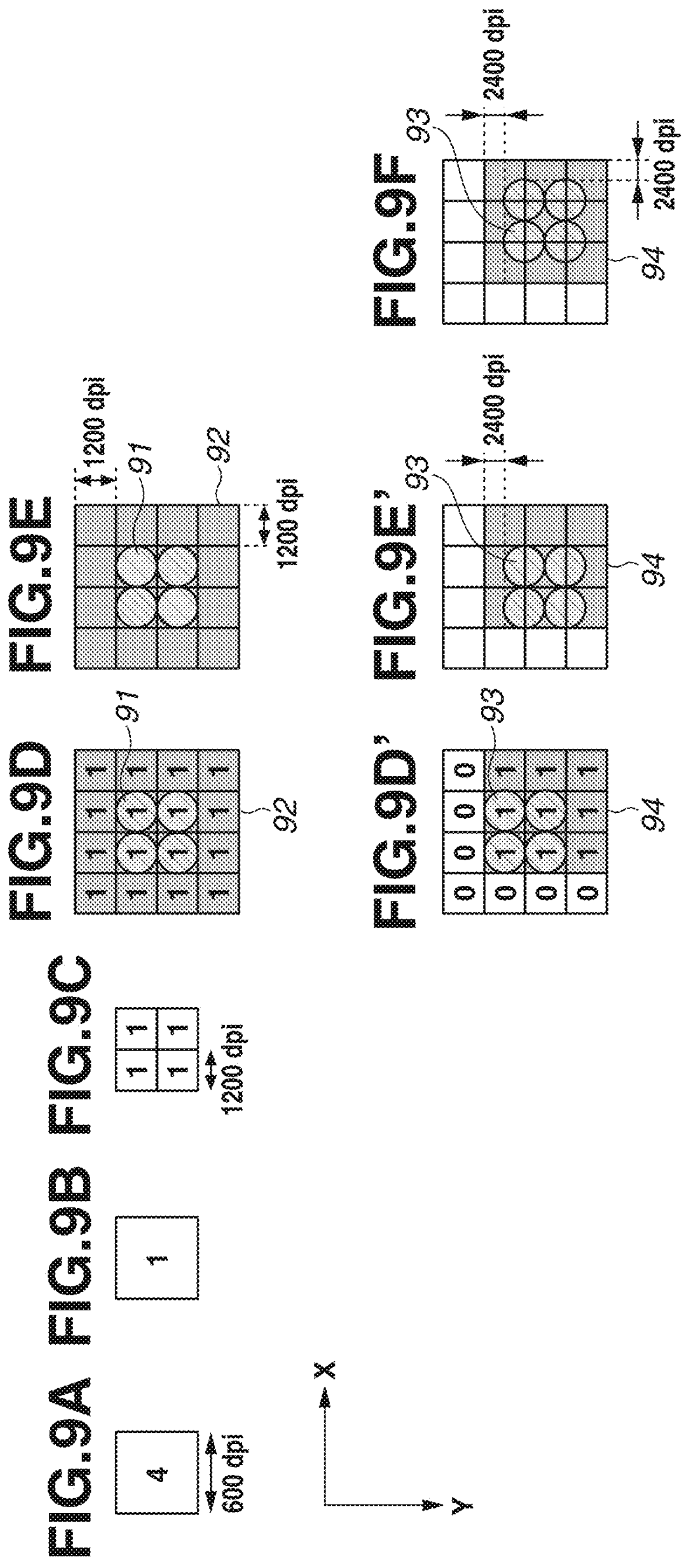
FIGS. 9A to 9F illustrate a bold process according to the first exemplary embodiment.

FIGS. 9A to 9F illustrates details of the bold process (expansion process) according to the present exemplary embodiment. FIG. 9A illustrates a pixel having 4 as its representative quantization value and having a resolution of 600 dpi. This representative quantization is subjected to the above expansion process and is consequently binarized as illustrated in FIG. 9B. Next, the resolution conversion is performed on the binarized data as illustrated in FIG. 9C. FIGS. 9D and 9E illustrate a comparison example after the resolution conversion is performed. FIG. 9D illustrates a state obtained after a conventional bold process has been performed, and FIG. 9E illustrates a state of ink landing when recording is performed by discharging the ink and reaction liquid to pixel areas on a recording medium corresponding to the data arrangement in FIG. 9D. Shaded dots 91 indicate landing of the CMYK ink. FIGS. 9D and 9E illustrate that the colored ink is applied to a total of four pixels, i.e., two consecutive pixels in the main-scanning direction (Y) and two consecutive pixels in the sub-scanning direction (X). A gray area 92 indicates the bold data of the reaction liquid. In this case, the bold process is a bald process of a one-pixel-width area in the main-scanning direction (Y) and the sub-scanning direction (X) (i.e., "1 bold"). The width of one pixel in the case of 1 bold will be referred to as a bold width. FIGS. 9D and 9E illustrate an example in which the bold process has been performed with a bold width of 1200 dpi in the main-scanning direction (Y) and the sub-scanning direction (X). As a result of 1 bold, the bold data indicates 16 pixels (4 pixels×4 pixels). Thus, a total of two-pixel areas. i.e., a one-pixel-width area over the dots 91 and a one-pixel-width area under the dots 91 in the main-scanning direction (Y), are also subjected to the bold process. In addition, a total of two-pixel areas, i.e., a one-pixel-width area to the right of the dots 91 and a one-pixel-width area to the left of the dots 91 in the sub-scanning direction (X), are also subjected to the bold process. In this way, the conventional bold process of a predetermined number of pixels located on one end and the other end of the area is performed on the number of consecutive pixels to which the colored ink is applied. Thus, the number of pixels to which the reaction liquid is applied is greater than the number of consecutive pixels to which the colored ink is applied by two pixels or an even number of pixels greater than two pixels. As a result of this bold process, the dot coverage (gray area 92) by the reaction liquid becomes wider than the dot coverage (shaded dots 91 area) by the CMYK ink.

On the other hand, FIG. 9D' illustrates the bold process according to the present exemplary embodiment. While the convention bold process is performed on one end and the other end in the bold direction, the bold process according to the present exemplary embodiment is performed only on one end. In accordance with the data illustrated as an example in FIG. 9D', through the bold process, the reaction liquid is applied to a total of nine pixels (3 pixels×3 pixels) including a one-pixel-width area in the main-scanning direction (Y) and a one-pixel-width area in the sub-scanning direction (X). FIG. 9E' illustrates dot landing state after the colored ink and the reaction liquid are applied based on the data in FIG. 9D'. Shaded dots 93 indicate landing of the CMYK ink. The colored ink is applied to a total of four pixels (two consecutive pixels in the main-scanning direction (Y) and two consecutive pixels in the sub-scanning direction (X)). On the other hand, a gray area 94 indicates landing of the reaction liquid. The reaction liquid is applied to nine consecutive pixels (three consecutive pixels in the main-scanning direction (Y)×three consecutive pixels in the sub-scanning direction (X)). As illustrated in FIG. 2, the group of discharge ports of the reaction liquid recording head 105 is shifted from the group of discharge ports of the CMYK recording heads 106 to 109 by 2400 dpi in the Y direction. Thus, as illustrated in FIG. 9E', the landing of the reaction liquid is shifted from that of the CMYK ink by 2400 dpi in the main-scanning direction (Y). In this way, the reaction liquid application amount can be reduced in the main-scanning direction (Y), compared with the conventional bold process illustrated in FIGS. 9D and 9E.

FIG. 9F illustrates a case in which registration adjustment for further shifting the landing in the sub-scanning direction (X) from the state in FIG. 9E' is performed. In steps S47 and S47', the timing of the discharge from the reaction liquid recording head 105 based on the reaction liquid data is shifted from the timing of the discharge from the CMYK recording heads 106 to 109 based on the individual CMYK data by 2400 dpi. As a result, the bold width of the reaction liquid can be set to 2400 dpi from the pixels to which the CMYK ink is applied both in the main-scanning direction (Y) and the sub-scanning direction (X).

Figure 10A:
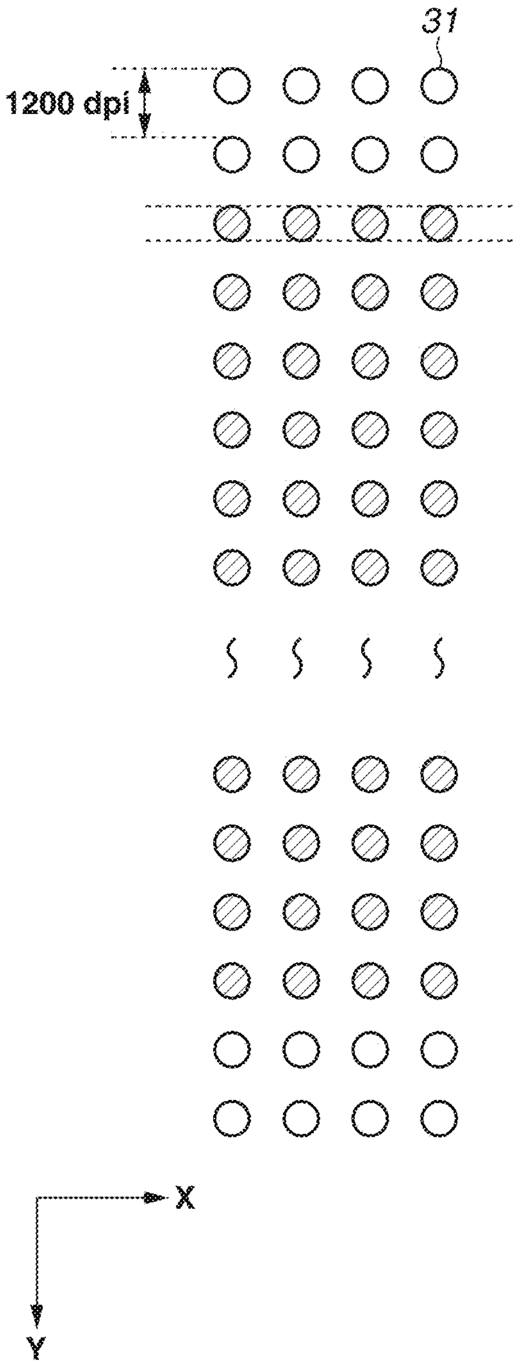
FIGS. 10A and 10B illustrate recording heads according to the first exemplary embodiment.
Figure 10B:
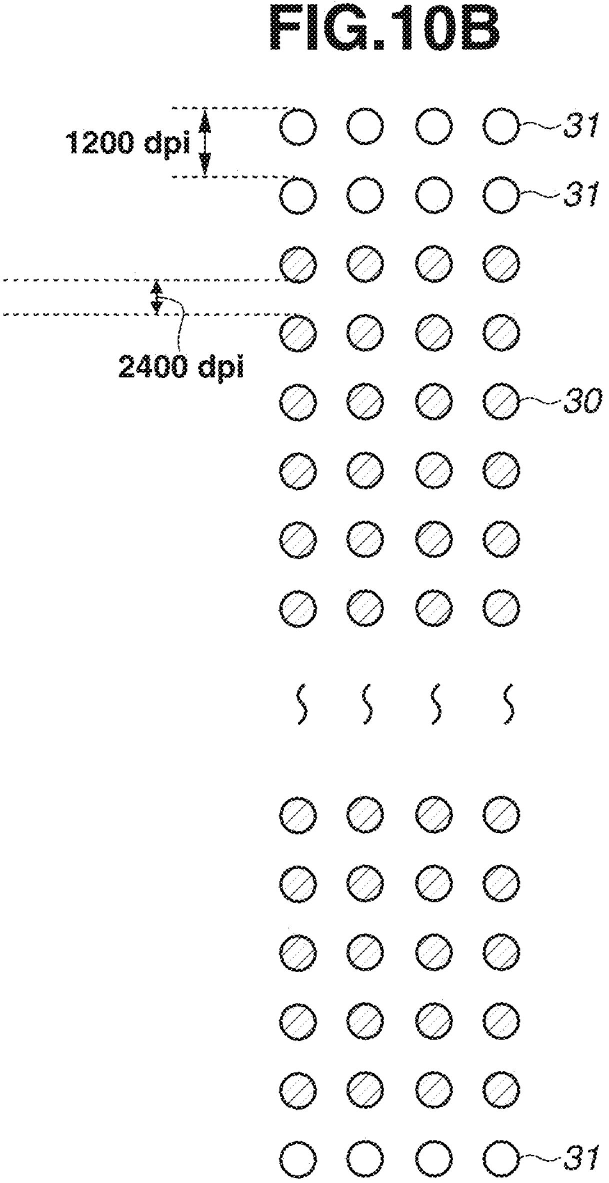

The first exemplary embodiment illustrates an example in which a single column of discharge ports is provided for each recording head as illustrated in FIG. 2. However, a plurality of columns may be provided for each ink. FIGS. 10A and 10B illustrate an example in which a single recording head includes a plurality of columns of discharge ports. FIG. 10A illustrates the recording heads 106 to 109 that discharge the CMYK colored ink, and FIG. 10B illustrates the recording head 105 that discharges the reaction liquid. In addition, as in FIG. 2, the discharge ports of the colored ink arranged on the recording heads 106 to 109 are shifted from the discharge ports of the reaction liquid arranged on the recording head 105 by 2400 dpi in the Y direction.

In addition, FIG. 9F illustrates an example in which the bold width from the CMYK ink is 2400 dpi both in the main-scanning direction (Y) and the sub-scanning direction (X). However, depending on the deviation characteristics of the landing location of the reaction liquid from the landing location of the CMYK ink, the registration shift may not be performed based on the discharge timing control in the sub-scanning direction (X). In a case where the landing location close to that in FIG. 9F can be obtained without performing the registration adjustment, the registration adjustment in the X direction is not required.

Figures 11A, 11B, 11C, 11D, 11E, 11F:
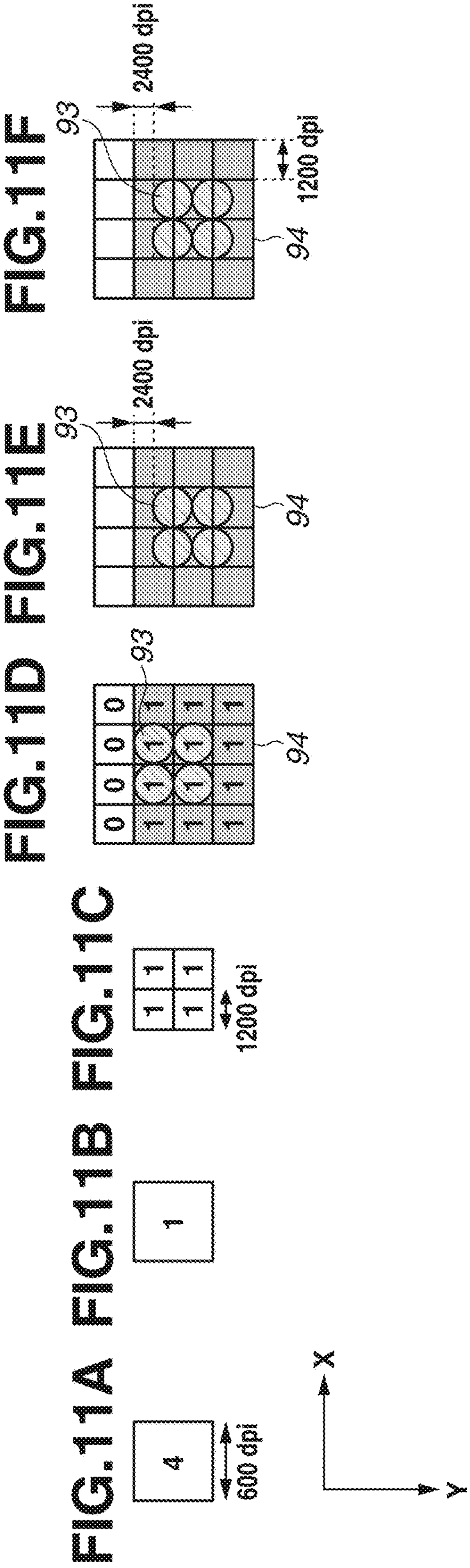
FIGS. 11A to 11F illustrate a bold process according to the first exemplary embodiment.

FIGS. 11A to 11F illustrate an example in which the bold process is performed only in the main-scanning direction (Y) with a resolution of 2400 dpi. FIG. 11A illustrates a pixel having 4 as a representative quantization value and having a resolution of 600 dpi, as in FIG. 9. This pixel is binarized by the above expansion process as illustrated in FIG. 11B, and next, the resolution conversion is performed as illustrated in FIG. 11C. FIG. 11D illustrates bold data generated by the bold process, indicating that the reaction liquid is applied to a total of 12 pixels (3 pixels in the main-scanning direction (Y)×4 pixels in the sub-scanning direction (X)). In this case, 2 pixels to which the colored ink is applied are shifted from the center of the reaction liquid of three pixels in the main-scanning direction (Y). FIG. 11E illustrates a case in which the CMYK colored ink and the reaction liquid are landed on their respective pixel areas on a recording medium corresponding to the data arrangement in FIG. 11D. Since registration adjustment for shifting the discharge timing by 2400 dpi in the sub-scanning direction (X) is not performed, the bold width corresponds to 2400 dpi in the main-scanning direction (Y) and 1200 dpi in the sub-scanning direction (X) as illustrated in FIG. 11F.

As described above, the bold process may be performed on the pixels to which the colored ink is applied only in one of the bold directions. In this way, the reaction liquid data can be generated only for the number of consecutive pixels to which the colored ink is applied+1 pixel. The number of consecutive pixels may be 1 pixel or 2 or more pixels. When the colored ink is applied to L consecutive pixels (L: an integer of 1 or more), the reaction liquid is applied to L+1 pixels. In this way, it is possible to generate the reaction liquid data on which the bold process is performed with a resolution (2400 dpi in the above example) higher than the output resolution (1200 dpi) of the colored ink recording data. The bold process is performed on the number of consecutive pixels and a one-pixel-width area in at least one of the main-scanning direction (Y) and the sub-scanning direction (X). As a result of the bold process, the dot coverage (gray area 94) of the reaction liquid becomes larger than the dot coverage (shaded dots 93) of the CMYK ink by 2400 dpi in the main-scanning direction (Y) and sub-scanning direction (X). This configuration as described above can improve the quality of the recorded image without increasing the reaction liquid application amount more than necessary.

Depending on the kinds of the colored ink and the reaction liquid, the number of pixels on which the bold process is performed with respect to the number of consecutive pixels to which the colored ink is applied, i.e., the bold width, may be set to 3 or more, instead of 1. In the conventional bold process, when the colored ink is applied to L consecutive pixels, an even number of pixels is additionally subjected to the bold process. However, since L+M pixels (M: an odd number of 1 or more) are subjected to the bold process according to the first exemplary embodiment, the application location of the reaction liquid can be controlled with a resolution higher than the colored ink recording resolution. As a result, the application location of the reaction liquid ink can be set with a resolution corresponding to 1/an integer of the resolution of the colored ink, and the reaction liquid application amount can be controlled more accurately.

In addition, while the present exemplary embodiment has been described based on an example in which 12-bit 1-plane reaction liquid data is generated from 12-bit 4-plane CMYK data in step S42', it is not limited to this example. As described in Japanese Patent Application Laid-Open No. 2007-276400, the bold process may be performed on the application data after the CMYK quantization, and the reaction liquid application data may be generated per colored ink. Next, the data may be subjected to AND to obtain one plane. The reaction liquid application data may be generated by any method, as long as the reaction liquid application data is generated based on corresponding colored ink data.

Figure 12A:
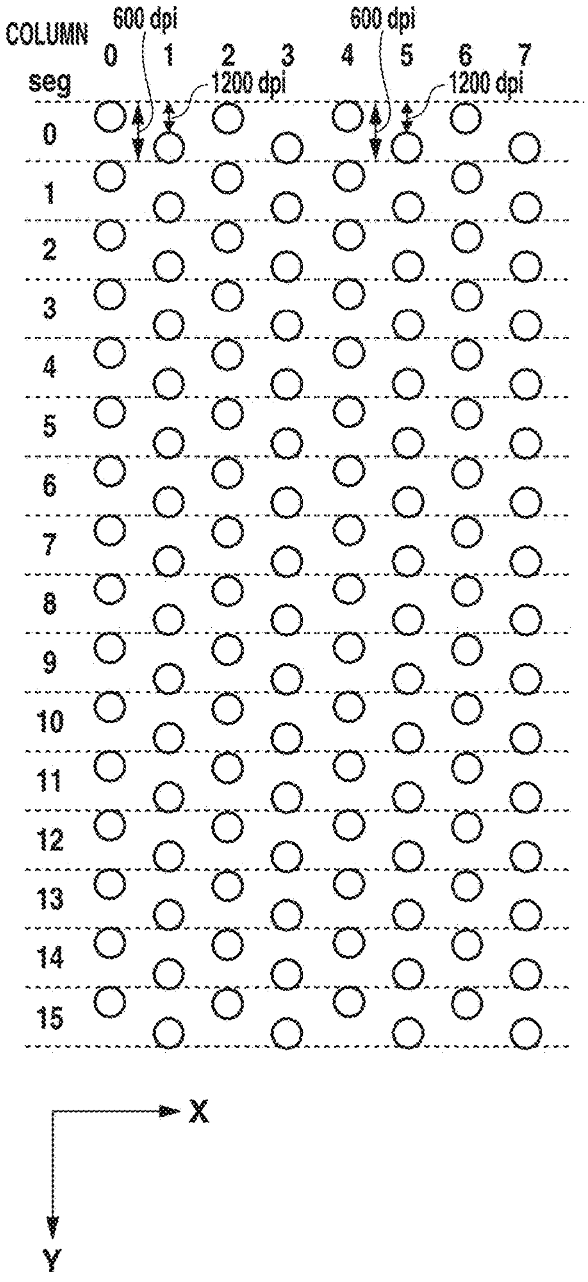
FIGS. 12A and 12B illustrate recording heads according to a second exemplary embodiment.
Figure 12B:
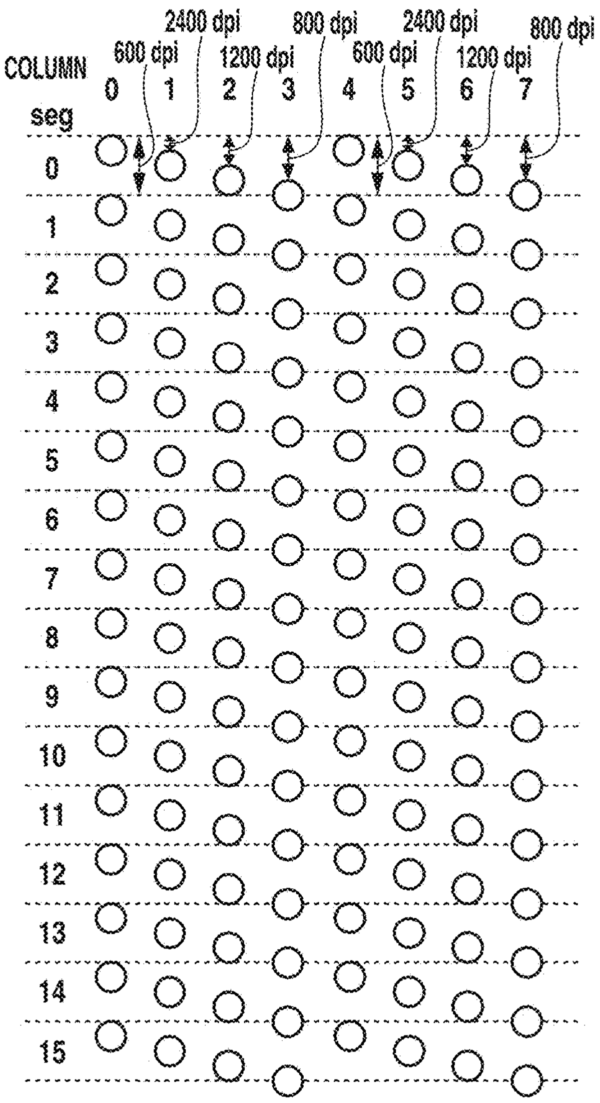

An internal configuration and image processing of an inkjet recording apparatus according to a second exemplary embodiment are similar to those according to the first exemplary embodiment. FIGS. 12A and 12B illustrate recording heads according to the present exemplary embodiment. While FIG. 12A illustrates the recording head 109 discharging black ink among the recording heads 105 to 109, the recording heads 106 to 108 have the similar configuration as that of the recording head 109. FIG. 12B illustrates the recording head 105 discharging reaction liquid.

The recording head 109 illustrated in FIG. 12A includes eight columns 0 to 7 of ink discharge ports 30. Each of the columns extends in a Y direction, and the eight columns 0 to 7 are arranged in an X direction. While each of the discharge port columns 0 to 7 is formed by 16 discharge ports 30 in FIG. 12A for simplicity, actually, each of the discharge port columns 0 to 7 includes a sufficient number of discharge ports 30 in a range such that the entire width of a recording medium in the Y direction can be recorded.

An individual column of discharge ports is formed with a resolution such that 600 discharge ports 30 are disposed per inch (this resolution will hereinafter be referred to as 600 dpi). Two discharge port columns adjacent to each other in the X direction are shifted from each other in a +Y direction by a distance corresponding to 1200 dpi. For example, the discharge port column 1 is shifted from the discharge port column 0 by 1200 dpi in the +Y direction. Thus, the discharge port column 0, the discharge port column 2, the discharge port column 4, and the discharge port column 6 of the recording head 109 are disposed to be able to form dots at the same locations in the Y direction. Likewise, the discharge port columns 1, 3, 5, and 7 are disposed to be able to form dots at the same locations in the Y direction.

As described above, the recording resolution of the recording head 109 in the main-scanning direction (Y) is 1200 dpi, and the discharge ports can be regarded as being disposed with a resolution of 1200 dpi.

On the other hand, while the recording head 105 has a configuration similar to that of the recording head 109, two discharge port columns neighboring each other in the X direction are shifted from each other by a resolution corresponding to a distance of 2400 dpi in the Y direction. For example, the discharge port column 1 is shifted from the discharge port column 0 by 2400 dpi in the +Y direction and the discharge port column 2 is sifted from the discharge port column 0 by 1200 (=2400/2) dpi in the +Y direction. Accordingly, the discharge port column 0 and the discharge port column 4 of the recording head 105 are disposed to form dots at the same locations in the Y direction. The same applies to the pair of discharge port columns 1 and 5, the pair of discharge port columns 2 and 6, and the pair of discharge port columns 3 and 7.

In addition, as illustrated on the left side in each of FIGS. 12A and 12B, 8 discharge ports of the discharge port columns 0 to 7 arranged in the Y direction are classified as the discharge ports belonging to the same seg (segment). For example, 8 discharge ports 30 of the discharge port columns 0 to 7 located at an end portion in a −Y direction are classified as the discharge ports belonging to seg0, and 8 discharge ports 30 located at an end portion in the +Y direction are classified as the discharge ports belonging to seg15.

As described above, the recording resolution of the recording head 105 in the main-scanning direction (Y) is 2400 dpi, and discharge ports can be regarded as being disposed with a resolution of 2400 dpi. The recording head 105 can apply the reaction liquid with a resolution twice as high as the resolution (1200 dpi) of the recording head 109. A single discharge port column may be regarded as a single discharge port group, and an individual recording head may have a plurality of discharge port groups.

A bold process (expansion process) will be described with reference to the flowchart in FIG. 4. Steps S41 to S44, and steps S41 to S43' are the same as those according to the first exemplary embodiment. An index development process is performed in steps S45 and S45'. Since the number of discharge port columns is 8 and the resolution is 600 dpi, the pattern in FIG. 8D indicates a development pattern by the columns 0 and 2 in FIG. 12, and the pattern in FIG. 8E indicates a development pattern by the columns 1 and 3 in FIG. 12. The pattern in FIG. 8F indicates a development pattern by the columns 4 and 6 in FIG. 12, and the pattern in FIG. 8G indicates a development pattern by the columns 5 and 7 in FIG. 12.

Figures 13A, 13B, 13C, 13D, 13E, 13F, 13G:
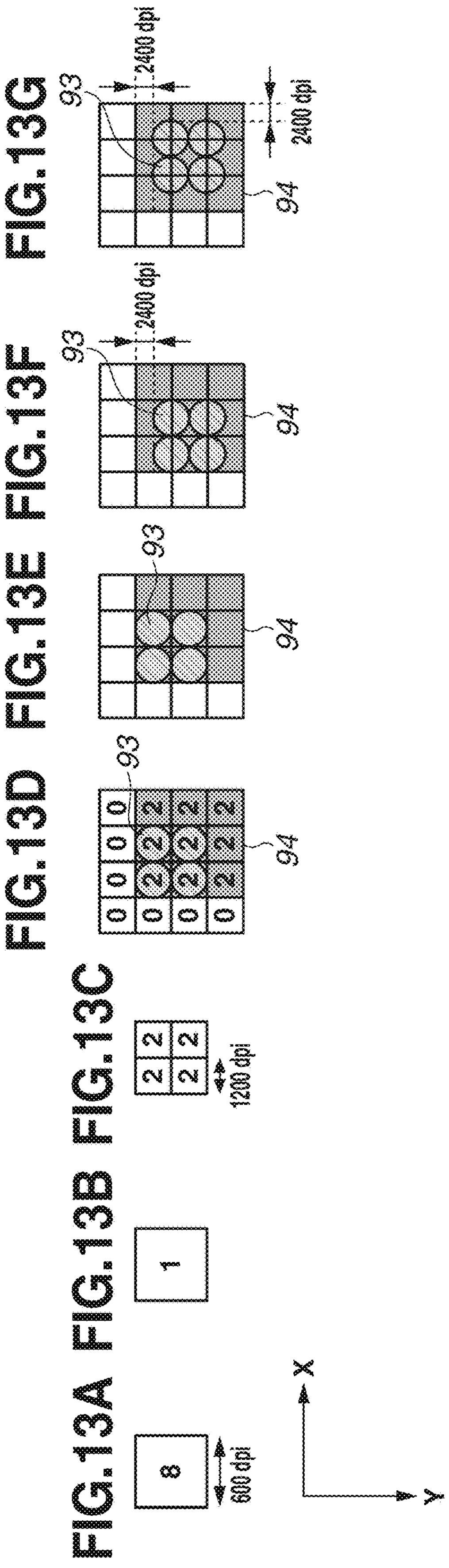
FIGS. 13A to 13G illustrate a bold process according to the second exemplary embodiment.

FIGS. 13A to 13G schematically illustrate details of the expansion process according to the second exemplary embodiment. FIG. 13A illustrates a pixel having 8 as its representative quantization value and having a resolution of 600 dpi. FIG. 13B illustrates a pixel having value "1"

obtained after the representative quantization value 8 is binarized. FIG. 13C illustrates 2×2 pixels, each of which has a value "2" and has a resolution of 1200 dpi after resolution conversion. FIG. 13D illustrates the bold process according to the present exemplary embodiment performed after the resolution conversion. While the bold width is 1 as in the first exemplary embodiment, the present bold process is performed on 9 pixels, not evenly on a one-pixel-width area around a target pixel area.

Figure 14A:
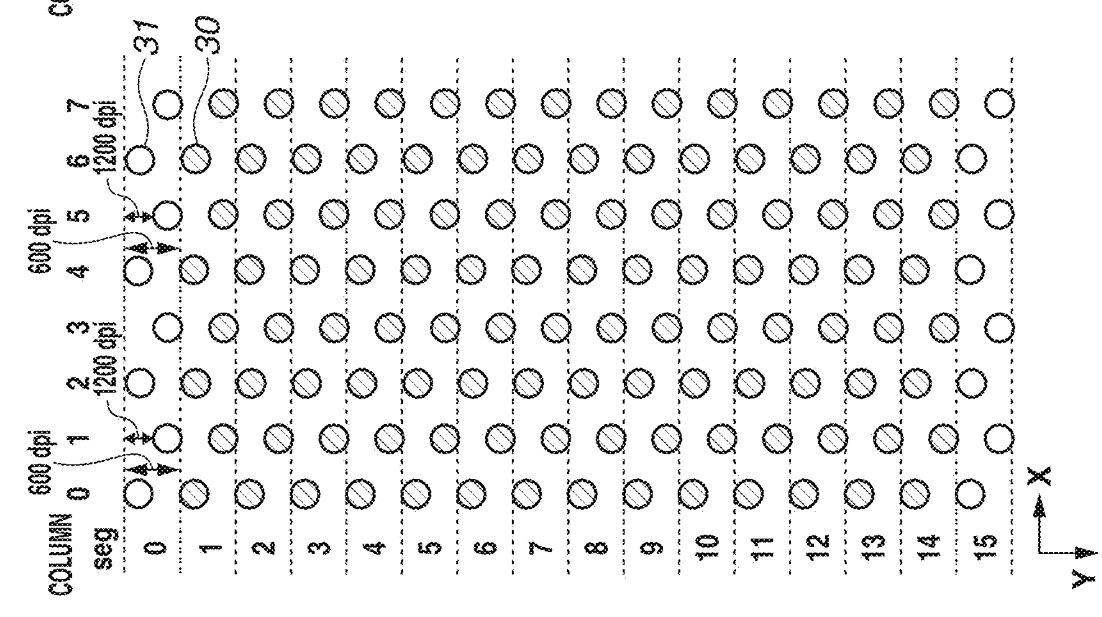
FIGS. 14A to 14C illustrate Y registration according to the second exemplary embodiment.
Figure 14B:
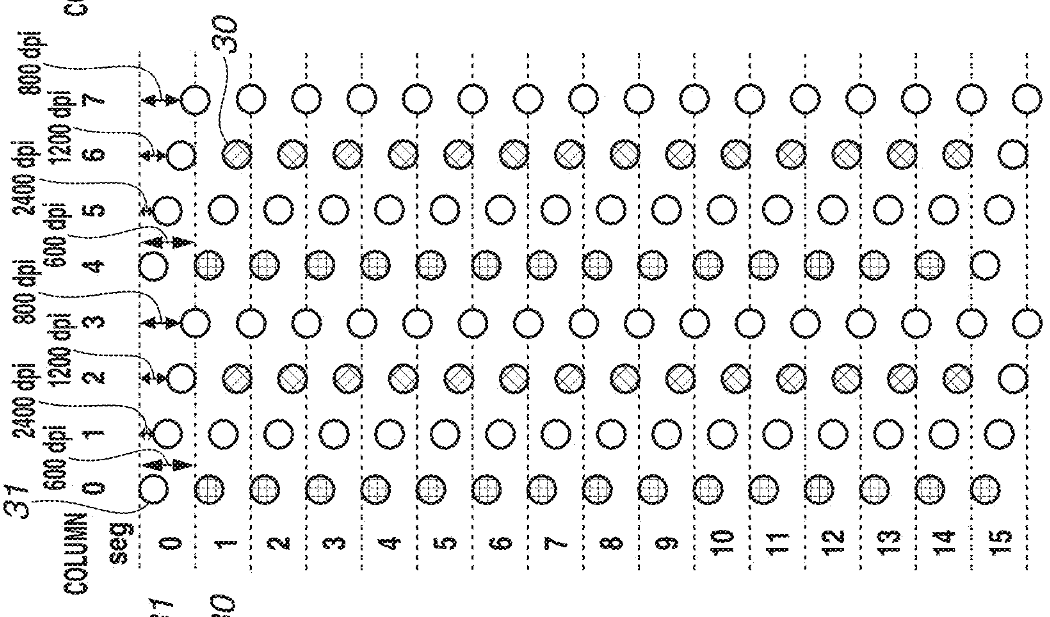
Figure 14C:
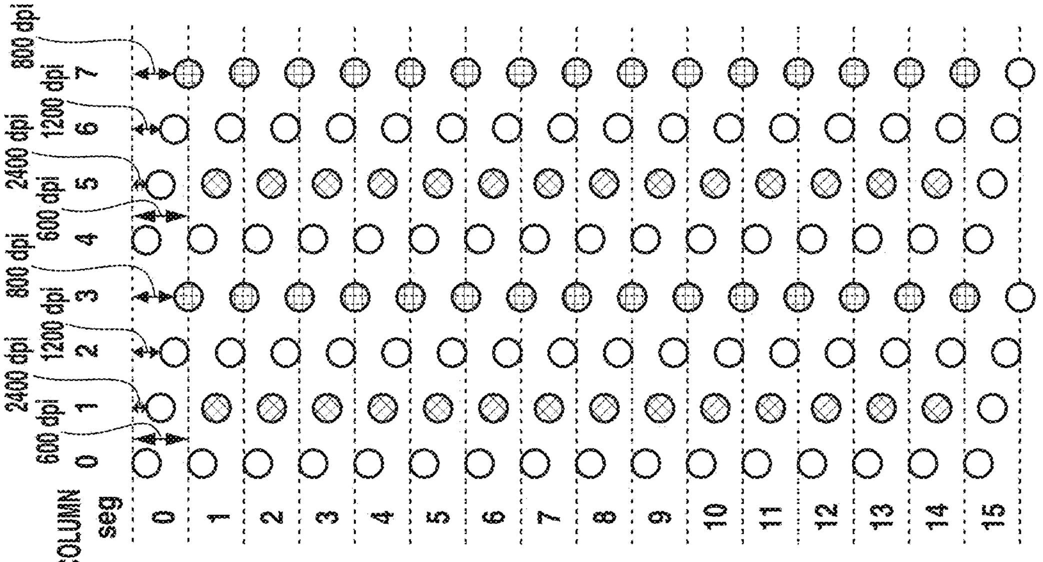

FIGS. 14A to 14C illustrate a relationship between the bold data and the discharge ports after an index development process.

FIG. 14A illustrates the CMYK recording heads 106 to 109, and the shaded areas indicate the discharge ports 30 having recording data. White discharge ports 31 are the discharge ports for Y registration. FIG. 14B illustrates the reaction liquid recording head 105 after the bold process, and the shaded areas 30 indicate the discharge ports having recording data. In FIG. 14B, the columns 0, 2, 4, and 6 have the reaction liquid data after the bold process. While the reaction liquid recording head 105 does not have the bold data in its all the columns, this is because the column distribution has been controlled by a parameter in the index development in step S45'. The white discharge ports 31 are used for the bold process and Y registration. FIG. 13E illustrates the ink landed state when the data in FIG. 13D is recorded. The shaded dots 93 illustrate the landed CMYK ink, and the gray area 94 illustrates the reaction liquid data after the bold process. According to the recording data illustrated in FIG. 14B, the bold data 94 of the reaction liquid is shifted from the CMYK ink 93 as illustrated in FIG. 13E. In the present exemplary embodiment, in steps S46 and S46' in FIG. 4, the registration adjustment (Y) of the reaction liquid recording head 105 in the main-scanning direction (Y) is shifted from the CMYK recording heads 106 to 109 by 2400 dpi. The registration adjustment (Y) with a resolution of 2400 dpi is performed as follows. As illustrated in FIG. 14C, the reaction liquid data in the column 0 of the recording head 105 is shifted to the column 3 and upward by 1 seg. In addition, the data in the column 4 is shifted to the column 7 and upward by 1 seg. The data in the columns 2 and 6 is shifted to the columns 1 and 5, respectively. As a result, as illustrated in FIG. 13F, the bold data 94 of the reaction liquid is shifted from the CMYK ink 93 by 2400 dpi in the main-scanning direction (Y), and the bold width in the Y direction becomes 2400 dpi. FIG. 13G illustrates the ink landed after the registration adjustment is performed on the CMYK data and the reaction liquid data in the sub-scanning direction (X) in steps S47 and S47'. At this point, registration of the reaction liquid is shifted from the CMYK ink by 2400 dpi in the sub-scanning direction (X). As a result, the bold width of the reaction liquid from the CMYK ink in the sub-scanning direction (X) also becomes 2400 dpi. As a result, it is possible to make the dot coverage (gray area 94) achieved by the reaction liquid through the bold process wider than the dot coverage (shaded areas 93) achieved by the CMYK ink by 2400 dpi in the main-scanning direction (Y) and the sub-scanning direction (X) while reducing the reaction liquid application amount.

FIGS. 13A to 13G illustrate an example in which the bold width of the reaction liquid from the CMYK ink is 2400 dpi in the main-scanning direction (Y) and the sub-scanning direction (X). However, the bold width may suitably be varied depending on the characteristics of the direction of the deviation of the reaction liquid data from the CMYK ink. As illustrated in FIG. 17G, the bold width only in the main-scanning direction (Y) may be set to 2400 dpi by changing the bold width in the sub-scanning direction (X) and the main-scanning direction (Y). Alternatively, as illustrated in FIG. 17G' the bold width may be set to 2400 dpi only in the sub-scanning direction (X). Alternatively, as illustrated in FIG. 17G", the bold width may be set only in the main-scanning direction (Y), and the width may be set to 2400 dpi. Alternatively, as illustrated in FIG. 17G", the bold width may be set only in the sub-scanning direction (X), and the width may be set to 2400 dpi. Still alternatively, as illustrated in FIG. 17G"", the reaction liquid data may be generated so that the reaction liquid data is set at the diagonal corners of each color dot 93. In this case, as illustrated in FIG. 17H, a reaction liquid dot 95 needs to be larger than a color dot 93.

Figure 15C:
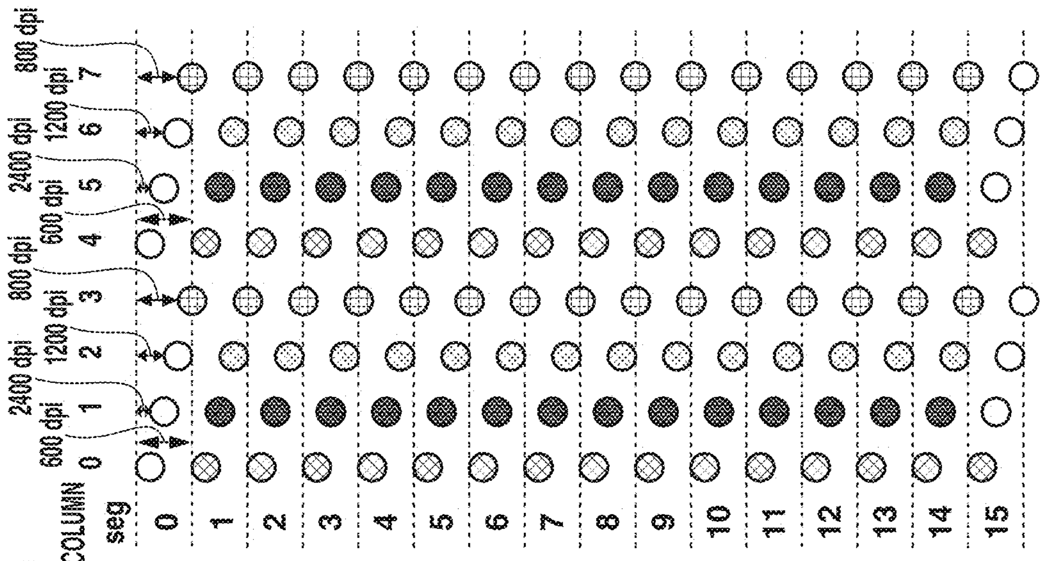
FIGS. 15A to 15C illustrate Y registration according to the second exemplary embodiment.
Figure 15B:
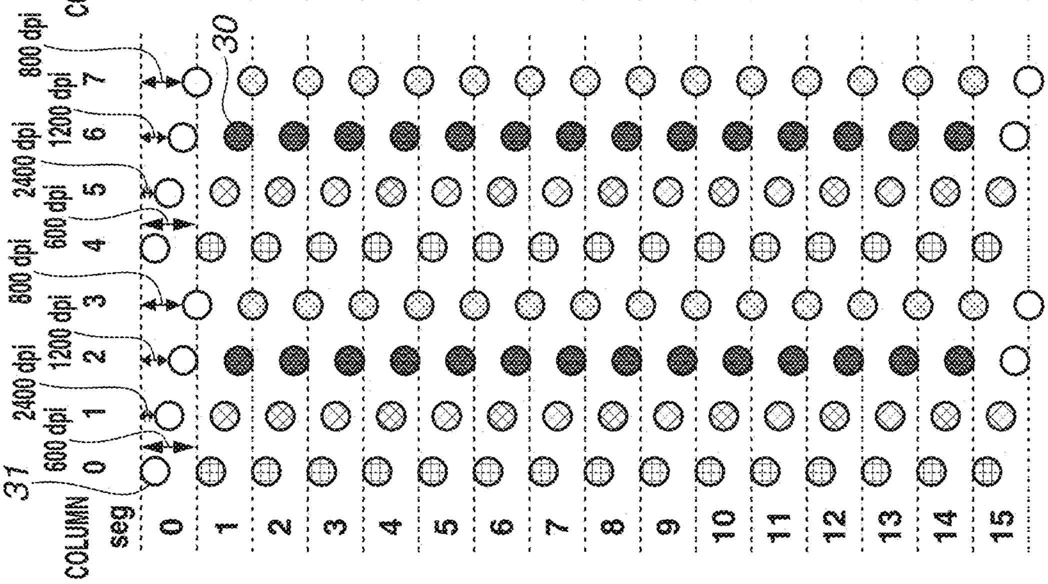
Figure 15A:
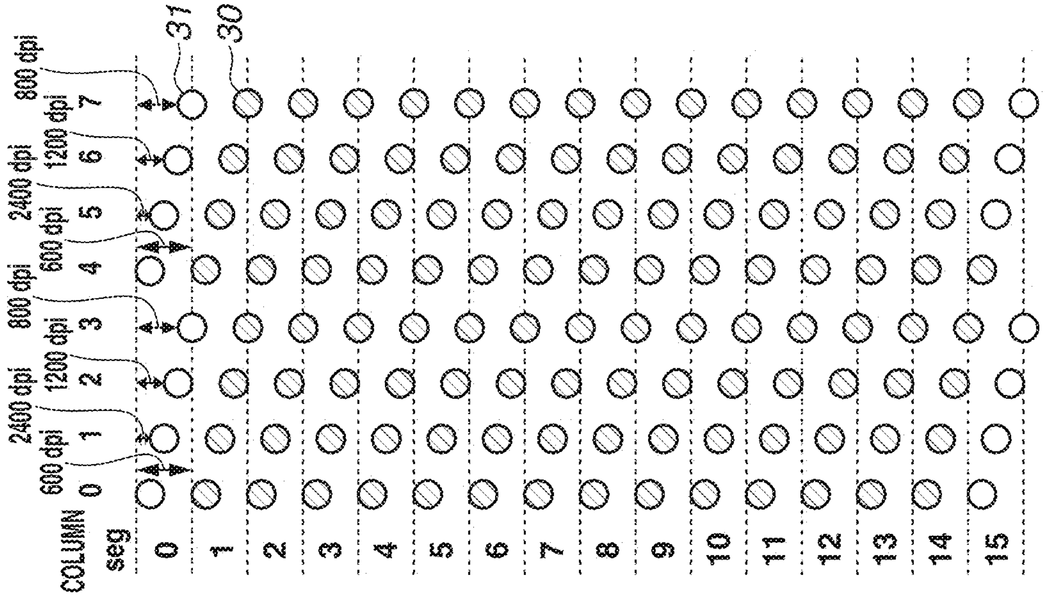
Figures 16A, 16B, 16C, 16D, 16E, 16F, 16G:
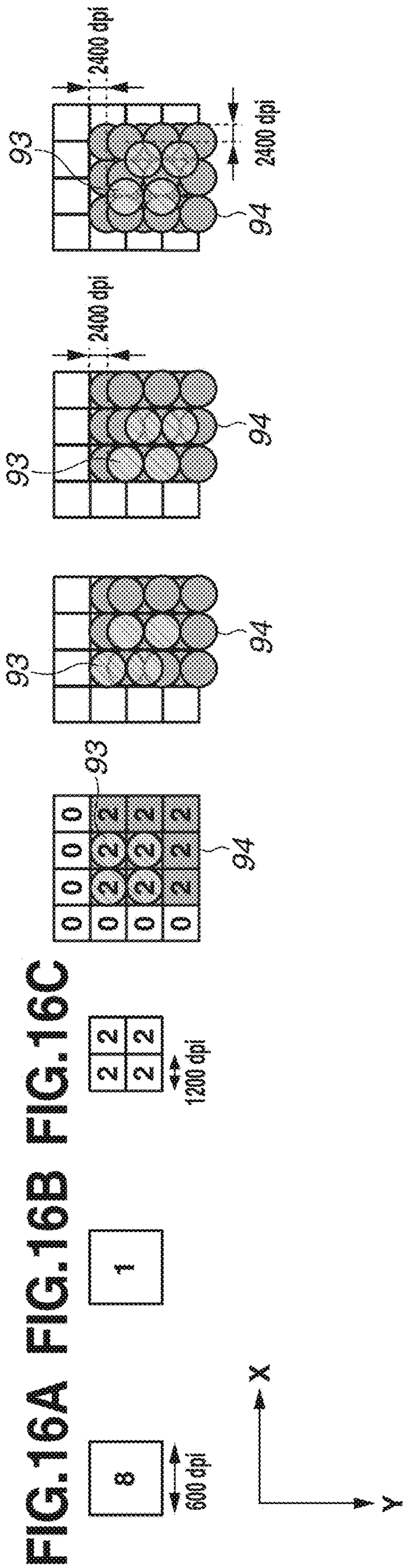
FIGS. 16A to 16G illustrate a bold process according to the second exemplary embodiment.

The present exemplary embodiment has been described based on an example of the bold process in which the bold data is distributed to some columns of the recording head 105 capable of discharging the reaction liquid as illustrated in FIGS. 14A to 14C. However, the present exemplary embodiment is not limited to this example. The bold data may be distributed to all the columns as illustrated in FIGS. 15A to 15C. FIG. 15A illustrates the recording heads 106 to 109 capable of discharging the CMYK colored ink, and the shaded areas indicate the discharge ports having recording data. FIG. 15B illustrates the recording head 105 capable of discharging the reaction liquid after the bold process, and grid, shaded, and dotted patters indicate the discharge ports having recording data. In this example, the recording heads 106 to 109 capable of discharging the CMYK ink and the recording head 105 capable of discharging the reaction liquid have the same configuration, and two discharge port columns neighboring each other in the X direction are disposed to be shifted from each other by a resolution corresponding to a distance of 2400 dpi in the Y direction. In addition, the reaction liquid data obtained after the bold process is stored in all the columns 0 to 7. FIG. 16E illustrates the landed ink state. The binarization (FIG. 16B), the resolution conversion (FIG. 16C), and the bold process (FIG. 16D) are the same as the example described above. Through the index development process in step S45', the data is distributed to all the columns of the reaction liquid recording head 105. Shaded dots 93 in FIG. 16E indicate landing of the CMYK ink, and a gray area 94 indicates the dots of the reaction liquid after the bold process. Herein, since the discharge ports of the recording heads 106 to 109 discharging the CMYK ink and the discharge ports of the recording head 105 discharging the reaction liquid are shifted from each other by 2400 dpi in the Y direction, when the ink is landed, there are dots shifted from each other by 2400 dpi. Next, in steps S46 and S46' in FIG. 4, the registration adjustment (Y) of the reaction liquid recording head 105 in the main-scanning direction (Y) is shifted from the recording heads 106 to 109 discharging the CMYK ink by a resolution of 2400 dpi. The registration adjustment (Y) with 2400 dpi is performed as follows. As illustrated in FIG. 15C, the data in the column 0 of the recording head 105 having the reaction liquid data is shifted to the column 3 and upward by 1 seg. In addition, the data in the column 4 is shifted to the column 7 and upward by 1 seg. The data in the columns 1 and 5 is shifted to the columns 0 and 4, respectively. The data in the columns 2 and 6 is shifted to the columns 1 and 5, respectively. The data in the columns 3 and 7 is shifted to the columns 2 and 6, respectively. As a result, as illustrated in FIG. 16F, the bold data 94 of the reaction liquid is landed with a shift of 2400 dpi from the CMYK ink 93 in the main-scanning direction (Y), and the bold width in the Y direction becomes 2400 dpi. FIG. 16G illustrates landing of the ink after the registration adjustment is performed on the CMYK ink and the reaction liquid data in the sub-scanning direction (X) in steps S47 and S47'. In this case, the registration of the reaction liquid is deviated from the CMYK ink by a resolution of 2400 dpi in the sub-scanning direction (X). As a result, the bold width of the reaction liquid from the CMYK ink in the sub-scanning direction (X) also becomes 2400 dpi.

In the above description, FIGS. 13A to 13G and FIGS. 16A to 16G illustrate an example in which the bold width from the CMYK ink is 2400 dpi in the main-scanning direction (Y) and the sub-scanning direction (X). However, depending on the characteristics of the direction of the deviation of the reaction liquid data from the CMYK ink, the bold width only in the main-scanning direction (Y) may be set to 2400 dpi by changing the bold width in the sub-scanning direction (X) and the main-scanning direction (Y), as illustrated in FIG. 18G. Alternatively, as illustrated in FIG. 18G', the bold width may be set to 2400 dpi only in the sub-scanning direction (X). Alternatively, as illustrated in FIG. 18G", the bold width may be set only in the main-scanning direction (Y), and the width may be set to 2400 dpi. Still alternatively, as illustrated in FIG. 18G'", the bold width may be set only in the sub-scanning direction (X), and the width may be set to 2400 dpi. Still alternatively, as illustrated in FIG. 18G"", the reaction liquid data may be generated in such a manner that the reaction liquid data is set at the diagonal corners of each color dot 93. In this case, as illustrated in FIG. 18H, a reaction liquid dot 95 needs to be larger than a color dot 93.

As described above, when the recording resolution of the reaction liquid is 2400 dpi while the recording resolution of the colored ink is 1200 dpi, the bold process of the reaction liquid data can be performed with a resolution higher than the recording resolution of the colored ink. As a result, the image quality can be improved without increasing the reaction liquid application amount more than necessary.

Other Exemplary Embodiments

The present disclosure is not limited to the configurations according to the above first and second exemplary embodiments. Embodiments of the present disclosure may be configured as follows.

<Bold Process>

Figure 19A:
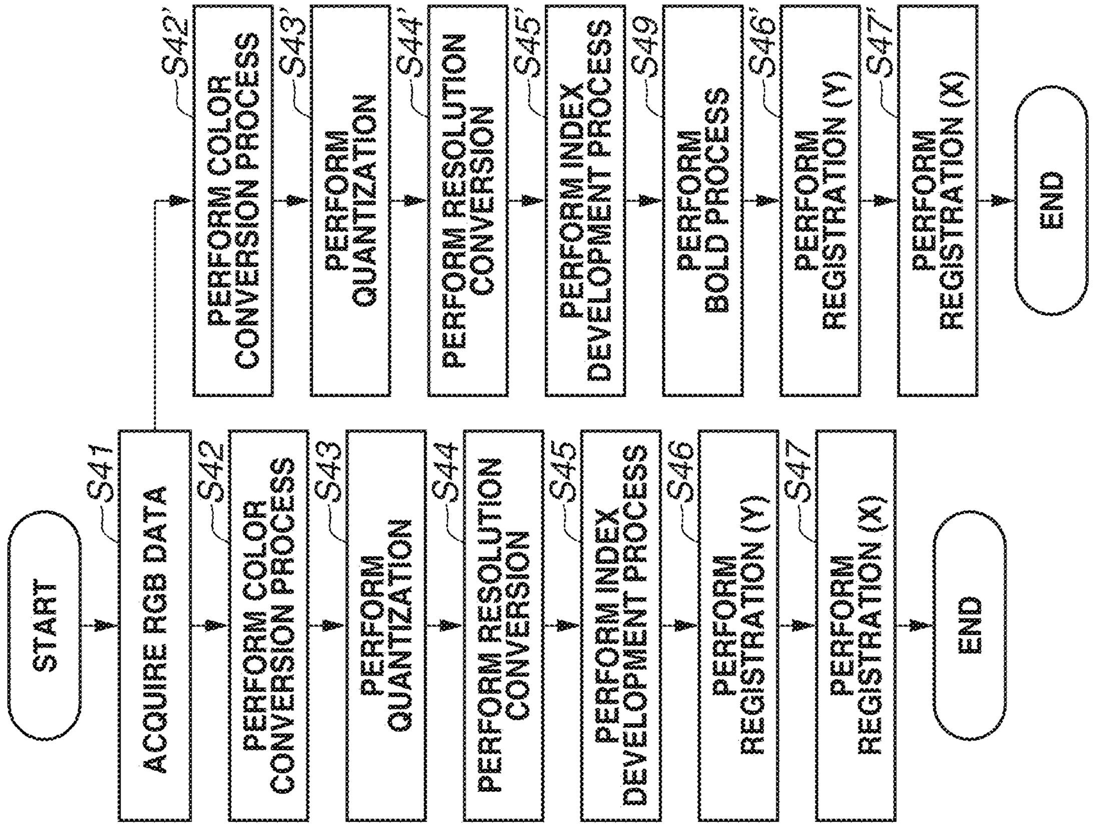
FIGS. 19A and 19B are flowcharts each illustrating image processing according to another exemplary embodiment.
Figure 19B:
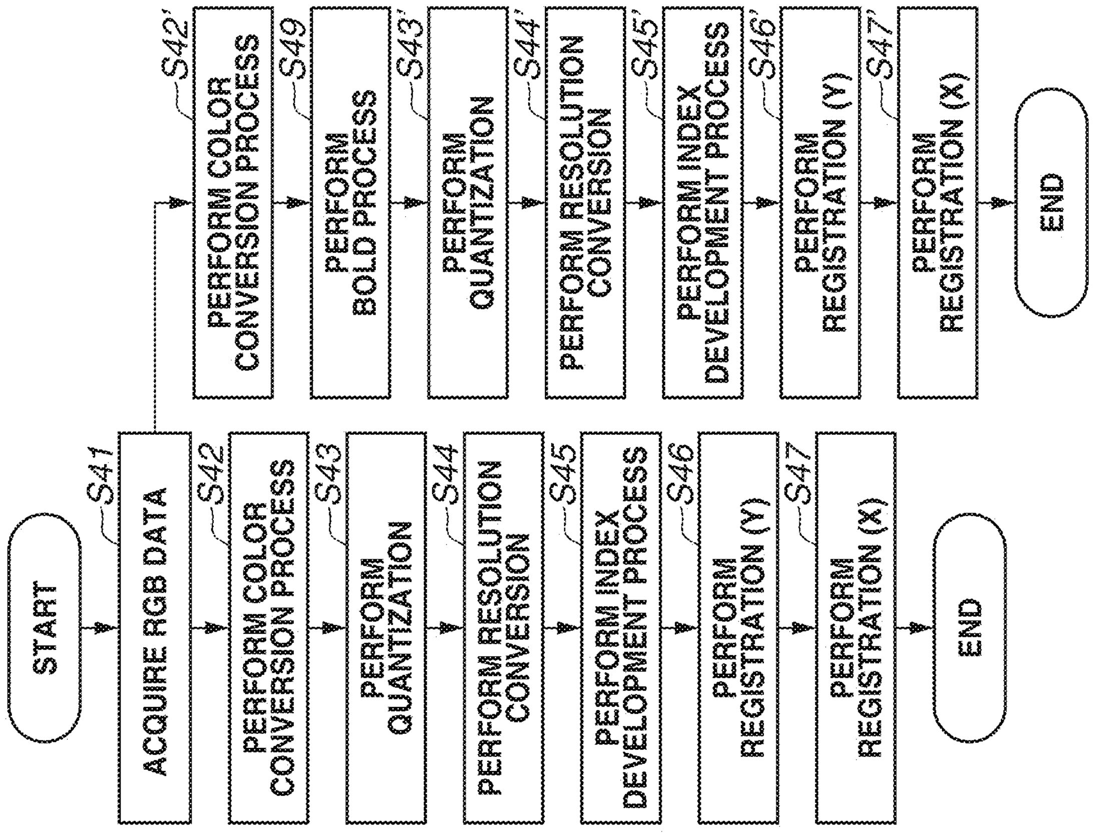
Figures 20A, 20B, 20C, 20D, 20E, 20F:
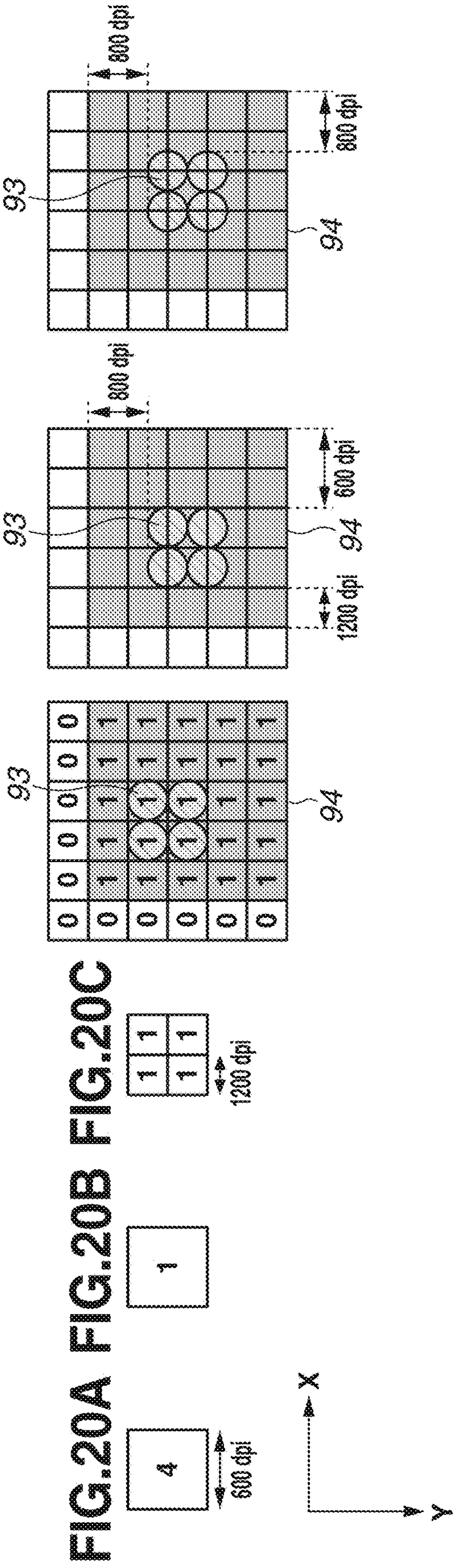
FIGS. 20A to 20F illustrate a bold process according to another exemplary embodiment.

FIGS. 19A and 19B are flowcharts each illustrating processing performed by a control program. As illustrated in FIG. 19A, the bold process in step S49 may be performed after step S45'. When the quantization resolution and the output data resolution are the same, the bold process in step S49 may be performed before the quantization processing in step S43' as illustrated in FIG. 19B.

<Functional Ink>

The above-described exemplary embodiments have been described based on an example in which the reaction liquid having reactivity to colored ink containing color material is used as the liquid giving functionality. However, the exemplary embodiments are not limited to this example. Ink containing resin and whose glossiness on a recording medium or ink film is different from that of colored ink may alternatively be used. For example, transparent liquid optimizer containing resin giving glossiness to print film may alternatively be used. In addition, white ink containing white color material for improving color generation on a substrate such as a transparent film, ink containing ultraviolet (UV) curing resin, or metallic ink containing metallic particles giving metallic luster may alternatively be used. In addition, in the above description, while the recording head 105 is the recording head that discharges the reaction liquid, the location of the recording head discharging the liquid giving functionality is not limited to this example. Any one of the recording heads 105 to 109 may be used as the recording head discharging the liquid giving functionality. In addition, while it is known that the image quality is improved by causing liquid giving functionality to land before or after colored ink lands on a pixel area to which the colored ink is applied, the application timing may be combined with that of the colored ink.

<Bold Width>

FIGS. 9A to 9E', FIGS. 11A to 11F. FIGS. 13A to 13G. FIGS. 16A to 16G. FIGS. 17A to 17H, and FIGS. 18A to 18H illustrate an example in which the bold process using the reaction liquid is performed on the individual CMYK inks. However, the present disclosure is not limited to this example, and the bold width may be increased further.

FIGS. 20A to 20F illustrate an example in which the bold width is 800 dpi, i.e., three bolds are achieved with a resolution twice as high as 1200 dpi that is the output data resolution. Even when the bold width is increased in this way, since the bold width is achieved based on a resolution higher than the output data resolution, the reaction liquid application amount can be further reduced. When this approach is generalized, the bold process is performed in such a manner that the reaction liquid is landed with a shift of an integral multiple of the resolution (2×N dpi) twice as high as the output data resolution (N dpi) in the main-scanning direction (Y) or the sub-scanning direction (X).

Figures 21A, 21B, 21C, 21D, 21E, 21F, 21G:
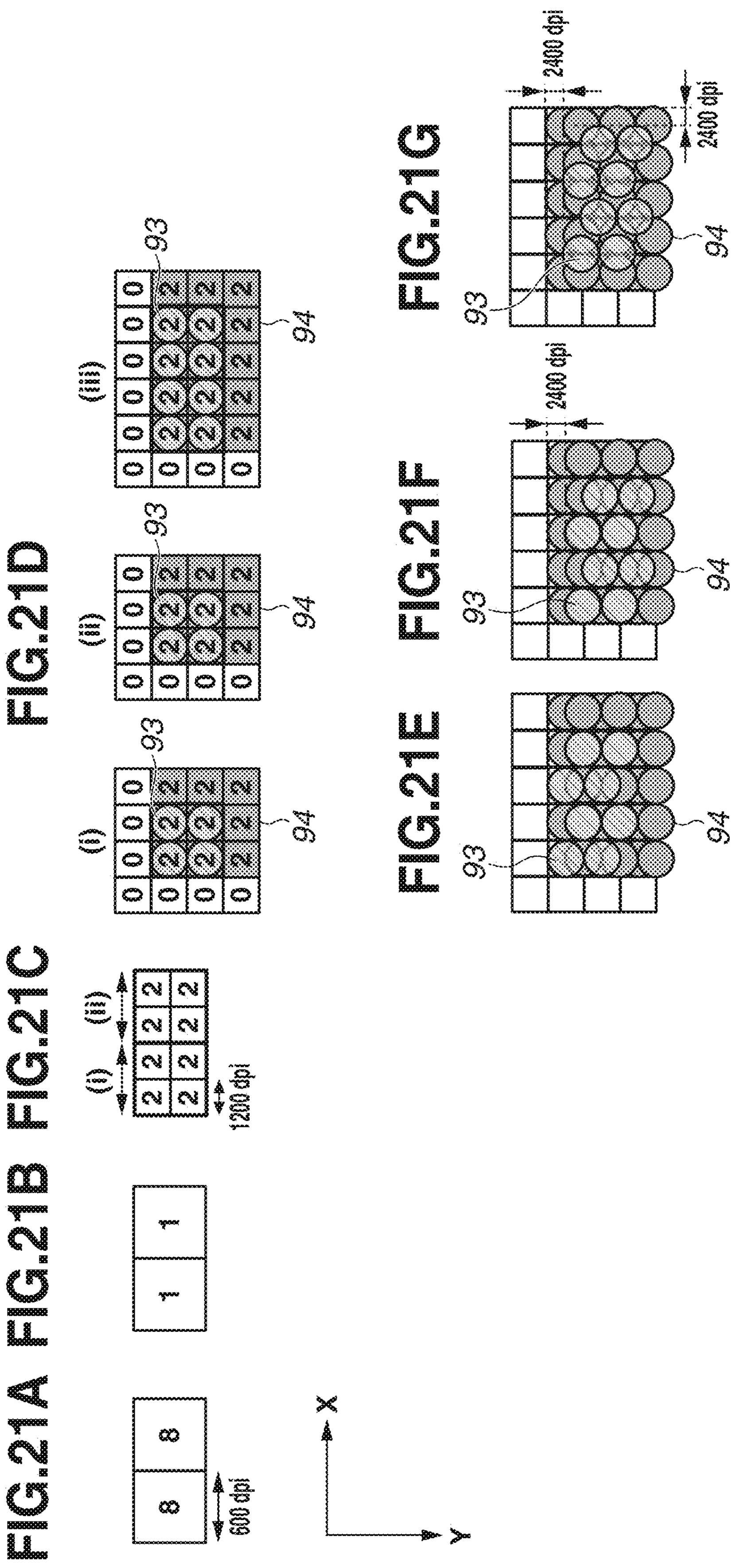
FIGS. 21A to 21G illustrate a bold process according to another exemplary embodiment.

In addition, in a case where bold pixels overlap as illustrated in FIG. 21, a logical sum of the bold pixels is used. FIG. 21A illustrates two neighboring pixels having CMYK ink data, and FIG. 21B illustrates a result of the binarization performed on the two neighboring pixels. FIG. 21C illustrates a result of the resolution conversion performed on the binarized pixels. (i) in FIG. 21D illustrates a result of the bold process performed on the pixels of (i) in FIG. 21C. (ii) in FIG. 21D illustrates a result of the bold process performed on the pixels (ii) in FIG. 21C. (iii) of FIG. 21D illustrates a result of a logical sum of the above results of the bold processes. FIG. 21E illustrates the state of landed ink. FIG. 21F illustrates the state of landed ink after the Y registration, and FIG. 21G illustrates the state of landed ink after the X registration.

<Recording Head>

While FIGS. 2A and 2B illustrate an example in which the resolution of the discharge ports in a single column is 1200 dpi, it is not limited to this example. The advantageous effects of the present disclosure can be obtained even when a higher resolution is used (e.g., the resolution of the discharge ports in a single column is 2400 dpi and the shift amount between the recording heads in FIGS. 2A and 2B in the Y direction is 4800 dpi) or even when a lower resolution is used (e.g., the resolution of the discharge ports in a single column is 600 dpi and the shift amount between FIGS. 2A and 2B in the Y direction is 1200 dpi). This approach is generalized as follows. When the resolution of the discharge ports in a single column is N dpi, the shift amount between FIGS. 2A and 2B in the Y direction may be 2×N dpi.

While FIG. 12B illustrates an example in which the resolution of the discharge ports in a single column is 600 dpi, it is not limited to this example. Any resolution can be used as long as A=B×X (B is an integer of 1 or more, X=Y/N) is satisfied, wherein the resolution of the discharge ports in a single column in FIG. 12B is N dpi, the shift amount between columns in the Y direction is Y dpi, the number of discharge port columns is X, and the total number of columns is A. For example, when the resolution (N) of the discharge ports in a single column is 1200 dpi, the shift amount (Y) between columns in the Y direction is 4800 dpi, and the number (X) of columns is 4, the total number of columns 8 (2×X). For example, when the resolution (N) of the discharge ports in a single column is 300 dpi, the shift amount (Y) between columns in the Y direction is 1200 dpi, and the number (X) of columns 4, the total number of columns 8 (2×X).

In addition, the above exemplary embodiments have been described by using a full multi printer capable of recording an image on the entire width of a recording medium in the Y direction in which the discharge ports of the individual recording heads are arranged. However, the present disclosure is not limited to these exemplary embodiments. The present disclosure is applicable to any recording apparatus that records an image by causing a recording head to move relative to a recording medium. For example, the present disclosure is applicable to a serial printer recording an image on a recording medium by causing a carriage including a recording head to move in a direction crossing a recording medium conveyance direction.

In addition, the above exemplary embodiments have been described by using a full multi printer including recording heads, one of which includes discharge ports discharging functional ink. These discharge ports are shifted from the arrangement of the discharge ports discharging the CMYK colored ink in the Y direction by ½ of the resolution of the discharge ports. On the other hand, in the case of a serial printer, the relative positional relationship between a recording medium and recording heads in the Y direction can be adjusted depending on a recording medium conveyance amount. Thus, the arrangement of the discharge port column discharging the functional ink is not limited to the arrangement of the discharge port columns discharging the CMYK colored ink shifted in the Y direction. The locations of the individual discharge ports discharging the CMYK colored ink may match or may be shifted from the locations of the individual discharge ports discharging the functional ink in the Y direction. By adjusting the recording medium conveyance amount, a dot of the functional ink can be formed at a location between ink dots discharged from two neighboring discharge ports discharging the CMYK colored ink on a recording medium.

In addition, the above exemplary embodiments have been described based on a mode in which the image processing unit 134 inside the recording apparatus performs the data generation processing of the image processing in FIG. 4. However, a data generation apparatus may be used in such a manner that the host apparatus HC1 or the upper apparatus HC2 performs the processing up to the data generation processing. Alternatively, a computer may read the control program illustrated in FIG. 4 from a storage medium and execute the read program.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-197649, filed Nov. 27, 2020, which is hereby incorporated by reference herein in its entirety.

What is claimed is:

1. A recording apparatus comprising:

a recording unit including a first discharge port group in which a plurality of first discharge ports for discharging first ink containing color material to a recording medium are disposed in a first direction and a second discharge port group in which a plurality of second discharge ports for discharging second ink having functionality with respect to the first ink to a recording medium are disposed in the first direction, at least one of the second discharge ports being disposed between two first discharge ports, neighboring each other in the first direction, of the plurality of first discharge ports;

a generation unit configured to generate second application data for applying the second ink from the second discharge port group based on first application data for applying the first ink from the first discharge port group; and a control unit configured to control the recording unit to apply the second ink based on the second application data, wherein the generation unit generates the second application data such that pixels indicating, in the second application data, that the second ink is applied become consecutive in (L+M) pixels (M is an odd number of 1 or more) in the first direction so as to correspond to pixels indicating that the first ink is applied in the first application data and are L consecutive pixels (L is an integer of 1 or more) in the first direction.

2. The recording apparatus according to claim 1, wherein the M is 1.

3. The recording apparatus according to claim 1, wherein the plurality of first discharge ports of the first discharge port group is disposed at first certain intervals in the first direction.

4. The recording apparatus according to claim 3, wherein the plurality of second discharge ports of the second discharge port group is disposed at the first certain intervals in the first direction.

5. The recording apparatus according to claim 3, wherein the recording unit further includes a third discharge port group in which a plurality of second discharge ports is disposed at the first certain intervals in the first direction, and wherein the plurality of second discharge ports of the third discharge port group is disposed at locations corresponding to the plurality of first discharge ports of the first discharge port group in the first direction.

6. The recording apparatus according to claim 5, wherein the recording unit is capable of discharging the first ink to a recording medium with a first resolution by the first discharge port group, and of discharging the second ink to a recording medium with a second resolution higher than the first resolution by the second discharge port group and the third discharge port group.

7. The recording apparatus according to claim 6, wherein the second resolution is twice as high as the first resolution.

8. The recording apparatus according to claim 1, wherein the resolution of the second application data in the first direction is the same as that of the first application data in the first direction.

9. The recording apparatus according to claim 1, wherein the generation unit generates the second application data so that pixels in the second application data indicating that the second ink is applied to become consecutive for (N+P) pixels (P: an odd number of 1 or more) in a second direction crossing the first direction so as to correspond to N consecutive pixels (N: an integer of 1 or more) in the second direction in the first application data indicating that the first ink is applied thereto.

10. The recording apparatus according to claim 9, wherein the P is 1.

11. The recording apparatus according to claim 1, further comprising a movement unit configured to move the recording unit relative to a recording medium in a second direction crossing the first direction.

12. The recording apparatus according to claim 11, further comprising a conveyance unit configured to convey a recording medium in the first direction, wherein the movement unit is a carriage that moves the recording unit in the second direction.

13. The recording apparatus according to claim 1, wherein the second ink is liquid having reactivity to the first ink, ink containing resin and having glossiness, different from that of the first ink, on a recording medium or ink film, white ink containing white color material, ink containing ultraviolet (UV) curing resin, or metallic ink containing metallic particles.

14. The recording apparatus according to claim 1, wherein the second ink lands on a recording medium earlier or later than the first ink.

* * * * *